US012007829B2

(12) United States Patent
Gandhi et al.

(10) Patent No.: US 12,007,829 B2
(45) Date of Patent: Jun. 11, 2024

(54) EXTENDED DYNAMIC INTELLIGENT LOG ANALYSIS TOOL

(71) Applicant: SAP SE, Walldorf (DE)

(72) Inventors: Nirjar Gandhi, New Delhi (IN); Anviti Srivastava, Gurugam (IN); Sudhir Verma, Gurgaon (IN); Martin Adam, Prisnotice (CZ); Vitezslav Visek, Brno (CZ)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/977,683

(22) Filed: Oct. 31, 2022

(65) Prior Publication Data

US 2024/0143430 A1   May 2, 2024

Related U.S. Application Data

(60) Provisional application No. 63/419,908, filed on Oct. 27, 2022.

(51) Int. Cl.
  *G06F 11/30* (2006.01)
  *G06F 11/07* (2006.01)
(52) U.S. Cl.
  CPC ...... *G06F 11/0778* (2013.01); *G06F 11/0709* (2013.01); *G06F 11/0781* (2013.01)
(58) Field of Classification Search
  CPC .......... G06F 11/0778; G06F 11/0709; G06F 11/0781
  USPC .............................. 714/25, 26, 57
  See application file for complete search history.

(56) References Cited

U.S. PATENT DOCUMENTS

| | | |
|---|---|---|
| 9,336,196 B2 | 5/2016 | Bhatnagar et al. |
| 10,210,280 B2 | 2/2019 | Verma |
| 10,235,100 B2 | 3/2019 | Verma |
| 10,248,622 B2 | 4/2019 | Verma |
| 10,339,121 B2 | 7/2019 | Verma |
| 10,706,065 B2 | 7/2020 | Gupta et al. |
| 2015/0161629 A1 | 6/2015 | Verma |
| 2015/0379073 A1 | 12/2015 | Verma et al. |
| 2018/0144027 A1 | 5/2018 | Gupta et al. |
| 2020/0169565 A1* | 5/2020 | Badawy ................ G06F 21/552 |
| 2021/0209159 A1 | 7/2021 | Verma et al. |

(Continued)

FOREIGN PATENT DOCUMENTS

| | | | |
|---|---|---|---|
| CN | 114143015 A | * | 3/2022 |
| CN | 114596015 A | * | 6/2022 |
| CN | 115169455 A | * | 10/2022 |

OTHER PUBLICATIONS

U.S. Appl. No. 17/977,704, filed Oct. 31, 2022, Gandhi et al.

(Continued)

*Primary Examiner* — Chae M Ko
(74) *Attorney, Agent, or Firm* — Fish & Richardson P.C.

(57) ABSTRACT

This disclosure describes implementations for categorizing and displaying a Gantt chart of categorized errors, as well as performing an odd pattern analysis to identify anomalous errors including obtaining a log file that includes a number of log entries where each log entry includes an error message. Converting each error message into an error vector using a predictive model. Determining a category for each error vector using a K-nearest neighbor algorithm, and generating a Gantt chart representing error messages arranged hierarchically by category as a function of time for display at a user interface.

20 Claims, 20 Drawing Sheets

(56) References Cited

U.S. PATENT DOCUMENTS

2022/0360604 A1* 11/2022 Smith .................... G06Q 50/01
2022/0385673 A1* 12/2022 Dong ................. H04L 63/1416

OTHER PUBLICATIONS

Faith Karabiber, "TF-IDF—Term Frequency-Inverse Document Frequency" Submitted on Apr. 15, 2021, <https://www.learndatasci.com/glossary/tf-idf-term-frequency-inverse-document-frequency/#:~:text=The%20TF%2DIDF%20of%20a,multiplying%20TF%20and%20IDF%20scores.&text=Translated%20into%20plain%20English%2C%20importance,between%20documents%20measured%20by%20IDF>, 11 pages.

Neo4j.com [online], "Closeness Centrality" Aug. 2020, retrieved on Oct. 25, 2022, retrieved from URL <https://neo4j.com/docs/graph-data-science/current/algorithms/closeness-centrality/>, 9 pages.

Pagliardini et al., "Unsupervised learning of sentence embeddings using compositional n-gram features." submitted on Mar. 7, 2017, arXiv preprint arXiv:1703.02507, 13 pages.

Wikipedia.org [online], "Louvain Method" created on Nov. 2014, retrieved on Oct. 25, 2022, retrieved from URL <https://en.wikipedia.org/wiki/Louvain_method>, 5 pages.

\* cited by examiner

```
#2.0BS#2021 01 22 09:05:11:927#+0100#Debug#com.sap.engine.service.security.authentication.callbackhandler#
#BC-JAS-SEC#security#C000AC#sap.comxapps~xmil~ear#com.sap.engine.services.security.authentication.callbackhandler#
Set password in login#

#2.0BS#2021 01 22 09:05:13:927#+0100#Debug#com.sap.engine.service.security.authentication.callbackhandler#
#BC-JAS-SEC#security#C000AC#sap.comxapps~xmil~ear#com.sap.engine.services.security.authentication.callbackhandler#
Password does not match with admin password#

#2.0BS#2021 01 22 09:05:15:927#+0100#Debug#com.sap.engine.service.security.authentication.callbackhandler#
#BC-JAS-SEC#security#C000AC#sap.comxapps~xmil~ear#com.sap.engine.services.security.authentication.callbackhandler#
Set password in login#
```

FIG. 3

▽ 0:
　　Component: "BC-JAS-SEC"　　◄— 510
　　Date: "2021 01 22 09:05:11:927"
　　DateExcTime: "2021 01 22"
　　DateSortTime: "20210122"
　　Error: "set password in login \r"
　　NonGrpError: "set password in login#\r"
　　Severity: "Debug"
　▷ Thread: {Name: "HTTP Worker [@323430275]", Num: "5", Type: "Dedicated_App"}
　　User: "Guest"
　▷ _proto_: Object ▽ 1:
　　Component: "BC-JAS-SEC"　　◄— 520
　　Date: "2021 01 22 09:05:13:927"
　　DateExcTime: "2021 01 22"
　　DateSortTime: "20210122"
　　Error: "password does not match with admin password \r"
　　NonGrpError: "password does not match with admin password#\r"
　　Severity: "Debug"
　▷ Thread: {Name: "HTTP Worker [@323430275]", Num: "5", Type: "Dedicated_App"}
　　User: "Guest"
　▷ _proto_: Object ▽ 2:
　　Component: "BC-JAS-SEC"　　◄— 530
　　Date: "2021 01 22 09:05:15:927"
　　DateExcTime: "2021 01 22"
　　DateSortTime: "20210122"
　　Error: "set password in login \r"
　　NonGrpError: "set password in login#\r"
　　Severity: "Debug"
　▷ Thread: {Name: "HTTP Worker [@323430275]", Num: "5", Type: "Dedicated_App"}
　　User: "Guest"

FIG. 5

```
▽ 0:
    ▽ Combine: Array(2)                                              ◄─── 610
       ▷ 0: {Date: "22-01-2021 09:05:11:927", Error: "set password in login#}
       ▷ 1: {Date: "22-01-2021 09:05:15:927", Error: "set password in login#}
         length: 2
       ▷ _proto_: Array(0)
       Component: "BC-JAS-SEC"
       CosineScore: NaN
       Count: 2
       Error: "set password in login \r"
       Final Rank: 1
       Final_Score: NaN
       visible: true
    ▷ _proto_: Object ▽ 1:
    ▷ Combine: [ {...} ]                    ◄─── 620
      Component: "BC-JAS-SEC"
      CosineScore: NaN
      Count: 1
      Error: "password does not match with admin password \r"
      Final Rank: 2
      Final_Score: NaN
      visible: true
```

FIG. 6

| DATE-TIME | LOG DETAILS | STACK TRACE |
|---|---|---|
| 07-04-2020 05:30:46:133 ←1110 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ⫸ |
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ⫸ |
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE | ⫸ |
| 07-04-2020 05:30:46:133 | JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE ←1120 | ⫸ ←1130 |

STACK TRACE

JAVAX.XML.WS.WEBSERVICEEXCEPTION: INVALID RESPONSE CODE (401). SERVER [HTTP://GRVV9905:50013/SAPCCMS.CGI] RETURNED MESSAGE [UNAUTHORIZED]. HTTP PROXY INFO: NONE
AT
COM.SAP.ENGINE.SERVICES.WEBSERVICES.ESPBASE.CLIENT.JAXWS.CORE.WSINVOCATIONHANDLER.PROCESSTRANSPORTBINDINGCALL(WSINVOCATIONHANDLER.JAVA74)
AT
COM.SAP.ENGINE.SERVICES.WEBSERVICES.ESPBASE.CLIENT.JAXWS.CORE.WSINVOCATIONHANDLER.INVOKESEISYNCMETHOD(WSINVOCATIONHANDLER.JAVA:12
AT
COM.SAP.ENGINE.SERVICES.WEBSERVICES.ESPBASE.CLIENT.JAXWS.CORE.WSINVOCATIONHANDLER.INVOKESEISYNCMETHOD(WSINVOCATIONHANDLER.JAVA:84
AT
COM.SAP.ENGINE.SERVICES.WEBSERVICES.ESPBASE.CLIENT.JAXWS.CORE.WSINVOCATIONHANDLER.INVOKE(WSINVOCATIONHANDLER.JAVA.65)
AT COM.SUN.PROXY.$PROXY1242.MTGETTIDBYNAME(UNKNOWN SOURCE)
AT
COM.SAP.MONITORING.WS.CONTROLLERS.CCMCCALLCONTROLLER.GETTIDSBYNAME(CCMSCALLCONTROLLER.JAVA:74)

*FIG. 12*

EXTENDED DYNAMIC INTELLIGENT LOG ANALYSIS TOOL

CLAIM OF PRIORITY

This application claims priority under 35 USC § 119(e) to U.S. Patent Application Ser. No. 63/419,908, filed on Oct. 27, 2022; the entire contents of which are hereby incorporated by reference.

BACKGROUND

Log analysis is the process of reviewing and understanding log files, which allows organizations to obtain useful insights and knowledge regarding the functionality of software operations. Organizations use these insights in their maintenance processes to troubleshoot software problems. However, log files are complex and take an enormous amount of time to analyze. When multiple log files need to be analyzed, the complexity and strain on resources is compounded.

SUMMARY

The present disclosure involves system, software, and computer implemented methods for categorizing and displaying a Gantt chart of categorized errors, as well as performing an odd pattern analysis to identify anomalous errors. Implementations include obtaining a log file that includes a number of log entries where each log entry includes an error message. Converting each error message into an error vector using a predictive model. Determining a category for each error vector using a K-nearest neighbor algorithm, and generating a Gantt chart representing error messages arranged hierarchically by category as a function of time for display at a user interface.

Implementations can optionally include one or more of the following features.

In some instances, the predictive model in an N-gram model. In some instances the predictive model is a Sent2Vec algorithm. In some instances, the predictive model is selected based on a performance criteria. In some instances the performance criteria includes a determination of topic coherence, or a topic coherence score.

In some instances, the log file is parsed to extract each error message from the number of log entries and, for each error message, an error object to be converted into the error vector is generated. The error object including at least one attribute associated with the error.

In some instances, the error message and determined categories are transmitted to a backend system for training of one or more machine learning models. These error message can be transmitted during a period of low network activity, and the one or more machine learning models to be trained includes an N-gram model, a Sent2Vec algorithm, and/or a K-nearest neighbor algorithm.

Implementations can further include an odd pattern analysis that identifies anomalous errors by obtaining a log file that includes a plurality of log entries, each log entry including an error message and a timestamp. Communities of errors are identified by: creating an error type for each unique error message in the plurality of log entries, dividing a log file into a plurality of sessions where each session represents a predetermined period of time, generating a graph where each error type is plotted as a node in the graph, determining a number of session for a plurality of node pairs in which both nodes of each node pair occur, plotting edges between each node pair of the plurality of node pairs, assigning a weight to each edge based on the determined number of sessions, and performing a community detection algorithm on the graph to identify communities of errors.

In some instances, the community detection algorithm is the Louvain method.

In some instances, a user provides input identifying a desired length of sessions, and a default session length is overwritten with the desired length of sessions as the predetermined time.

In some instances the log file is parsed to extract each error message from the plurality of entries and, for each error message, an error object including at least one attribute associated with the error is generated. The at least one attribute can be a date and time of the error and/or a text phrase associated with the error.

In some instances, for each particular node, a plurality of centrality values are determined, where each centrality value represents a closeness of the particular node with a particular community to which it is not assigned. If a node has a centrality value greater than a predetermined threshold, that node can be assigned to the particular community associated with the centrality value in addition to the identified community of errors.

The details of these and other aspects and embodiments of the present disclosure are set forth in the accompanying drawings and the description below. Other features, objects, and advantages of the disclosure will be apparent from the description, drawings, and claims.

DESCRIPTION OF DRAWINGS

Some example embodiments of the present disclosure are illustrated by way of example and not limitation in the figures of the accompanying drawings, in which like reference numbers indicate similar elements.

FIG. 3 illustrates example data of a log file in raw form.

FIG. 5 illustrates example data extracted from a log file.

FIG. 6 illustrates an example of data extracted from a log file being grouped together.

FIG. 11 illustrates an example GUI in which log details of a log entry are displayed.

FIG. 12 illustrates an example GUI in which a stack trace is displayed.

DETAILED DESCRIPTION

This disclosure describes methods, software, and systems for providing advanced filtering and analysis of log files to permit users to rapidly identify relationships between errors and potential causes of system crashes or other performance issues.

In general, when computing systems encounter errors or other events, they record them in a log. These log files can cover thousands or hundreds of thousands of events over a period of hours, days, weeks, months, or other time. If a system is experiencing degraded performance, system crashes, or unexpected behavior, a system developer, user, or administrator may wish to review the log file in order to determine whether an abnormality is occurring, and if so, what the cause of the abnormality is. Manually searching through thousands of log entries is not practically feasible. Additionally, the log files typically are not in a human readable format, and must be parsed to be understood by the developer. The disclosed solution provides an automated process for collecting, categorizing, and displaying errors in log files in a user friendly manner that allows further analysis by the user.

The described solution is advantageous in that it can dramatically reduce the workload of the developer. Additionally, all processing can occur locally, which reduces bandwidth consumption required if, for example, large log files needed to be transmitted to a backend system for processing. Another advantage of local processing is that privacy and security is enhanced, since potentially sensitive log files need not be transmitted to a remote system.

Figure 1:
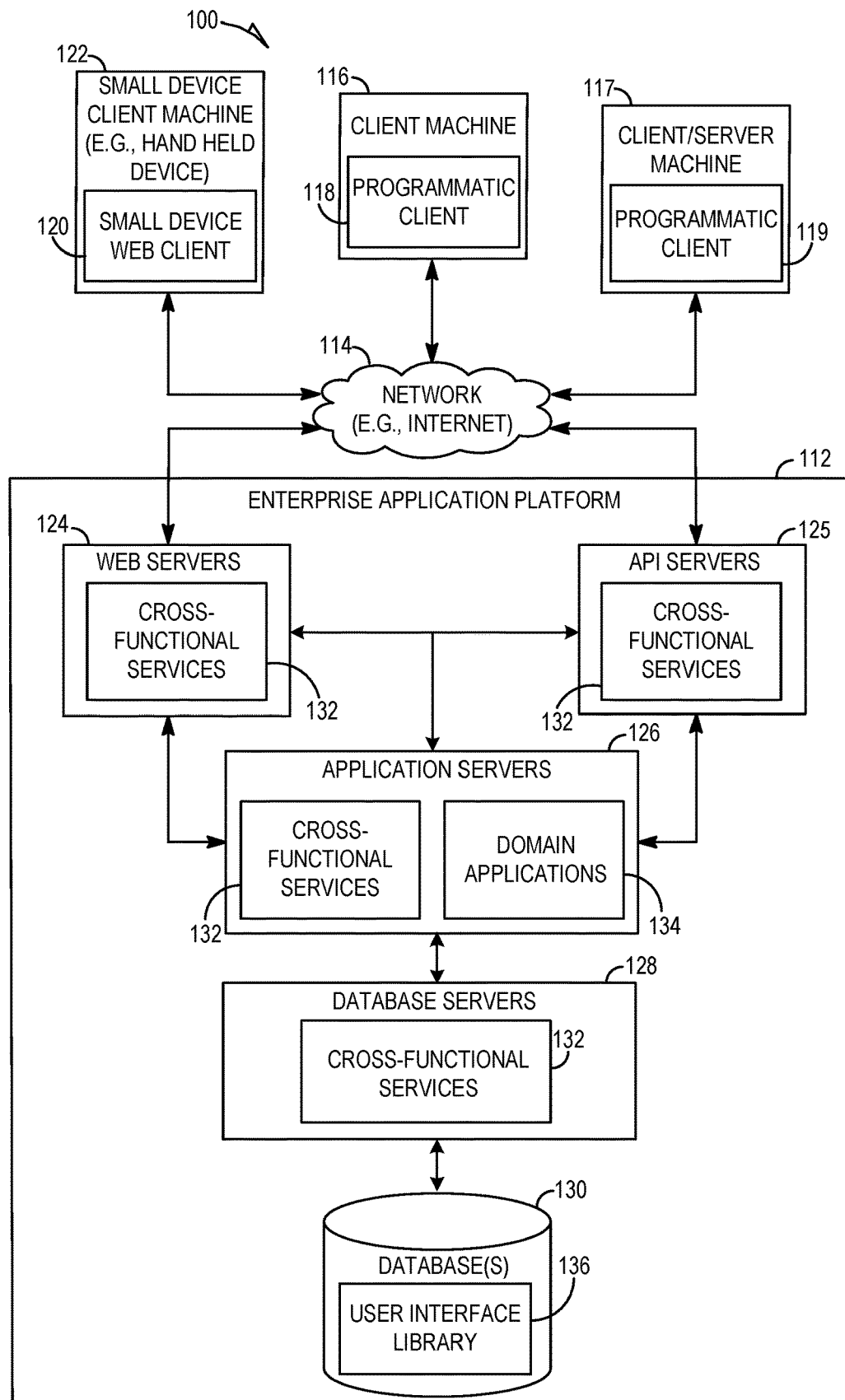
FIG. 1 is an example network diagram illustrating a system.

Turning to the illustrated example implementations, FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
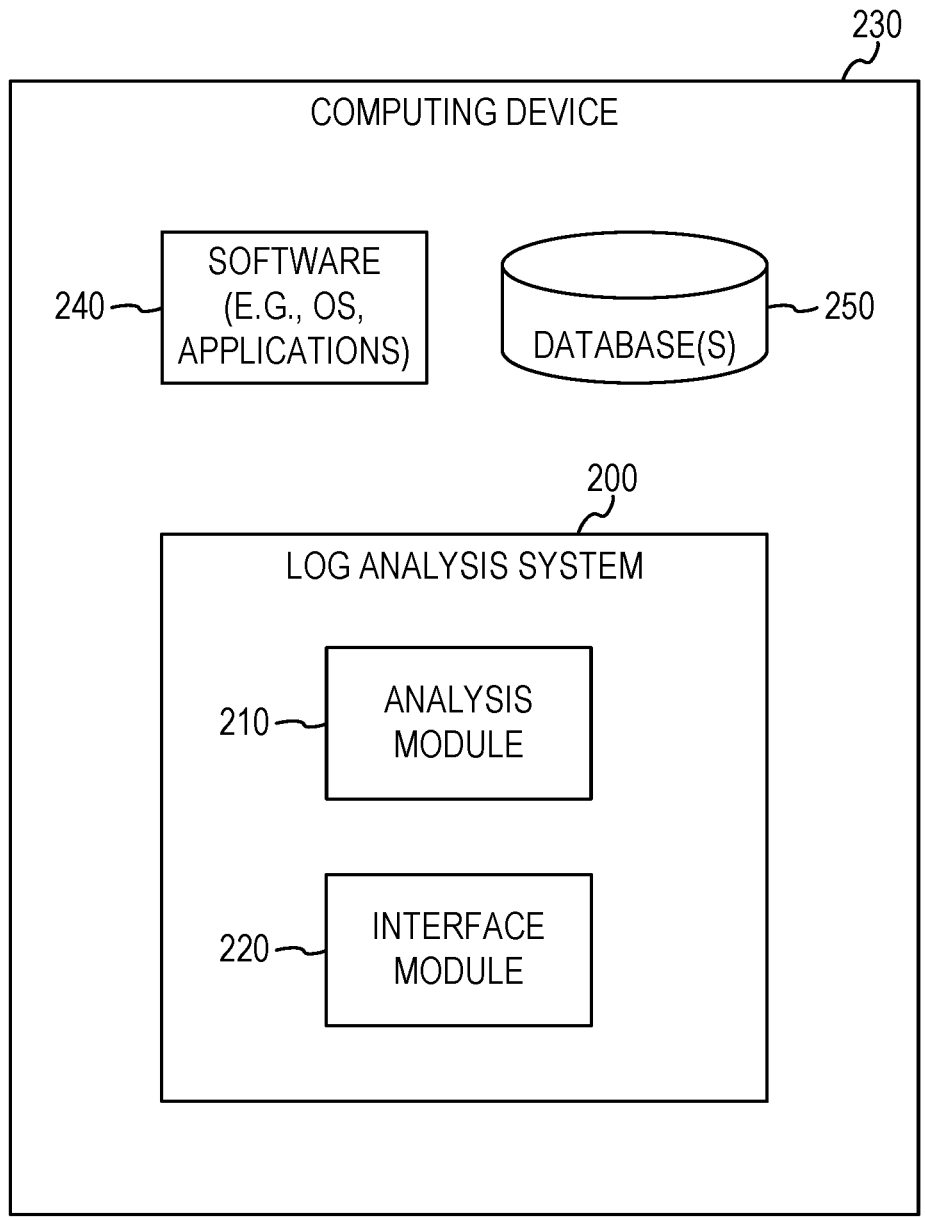
FIG. 2 is a block diagram illustrating an example log analysis system.

FIG. 2 is a block diagram illustrating a log analysis system 200. In some embodiments, the log analysis system 200 comprises an analysis module 210 and an interface module 220. The analysis module 210 and the interface module 220 can reside on a computer system, or other machine, having a memory and at least one processor (not shown), such as a computing device 230. The computing device 230 may comprise any of the machines 116, 117, or 122 of FIG. 1. However, other types of computing devices are also within the scope of the present disclosure.

In some example embodiments, one or more of the analysis module 210 and the interface module 220 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, one or more of the analysis module 210 and the interface module 220 are configured to receive user input. For example, one or more of the analysis module 210 and the interface module 220 can present one or more graphical user interface (GUI) elements (e.g., drop-down menu, selectable buttons, text field) with which a user can submit input. In some example embodiments, one or more of the analysis module 210 and the interface module 220 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the analysis module 210 is configured to obtain one or more log files, with each log file comprising a plurality of log entries. For example, the interface module 220 may display one or more user interface elements that the user may interact with to upload the log file(s), such as a field for entering a file name, a selectable element for browsing files to select for upload, and a selectable element for triggering an upload of any files selected by the user to the analysis module. Once the files are uploaded the user can also choose to select/deselect certain files which he may not need to be analyzed in current analysis cycle. A log file is a file that records events that occur in an operating system or other software runs.

Each log entry of the log file may comprise a date and time of log activity occurrence, a severity of the log activity, a component or module where the log activity occurred, user information identifying a user associated with the log activity (e.g., a user who was using the computing device during the log activity occurrence), a thread identification of the processing thread where the log activity occurred, a message indicating the nature or type of log activity, and a stack trace, as well as other data. In some example embodiments, the message comprises an error message that includes a brief description about the log activity.

In some example embodiments, the log analysis system 200 may comprise a client-side software tool running on the computing device 230. The computing device 230 may comprise the small device client machine 122, the client machine 116, or the client/server machine 117 of FIG. 1. However, other implementations of the computing device 230 are also within the scope of the present disclosure. The computing device 230 may comprise software 240 and one or more databases 250. The software 240 may comprise an operating system. The software 240 may additionally or alternatively comprise one or more software applications. The software 240 may generate the log files and store them in the database(s) 250, and the user may upload the log files from the database(s) 250 to the analysis module 210.

The log files may comprise large text of log data in raw format. Therefore, before analyzing a log file, the analysis module 210 may convert the data of the log file into structured form to make it useful for analysis. In some example embodiments, the analysis module 210 performs data wrangling on the log file. Data wrangling is a process of structuring, cleaning, and enriching raw data of one form to another format with an aim to make it more suitable and appropriate for the purpose of analysis and processing. FIG. 3 illustrates example data of a log file 300 in raw form. In FIG. 3, the log file includes a plurality of log entries 310 in raw form.

Figure 4:
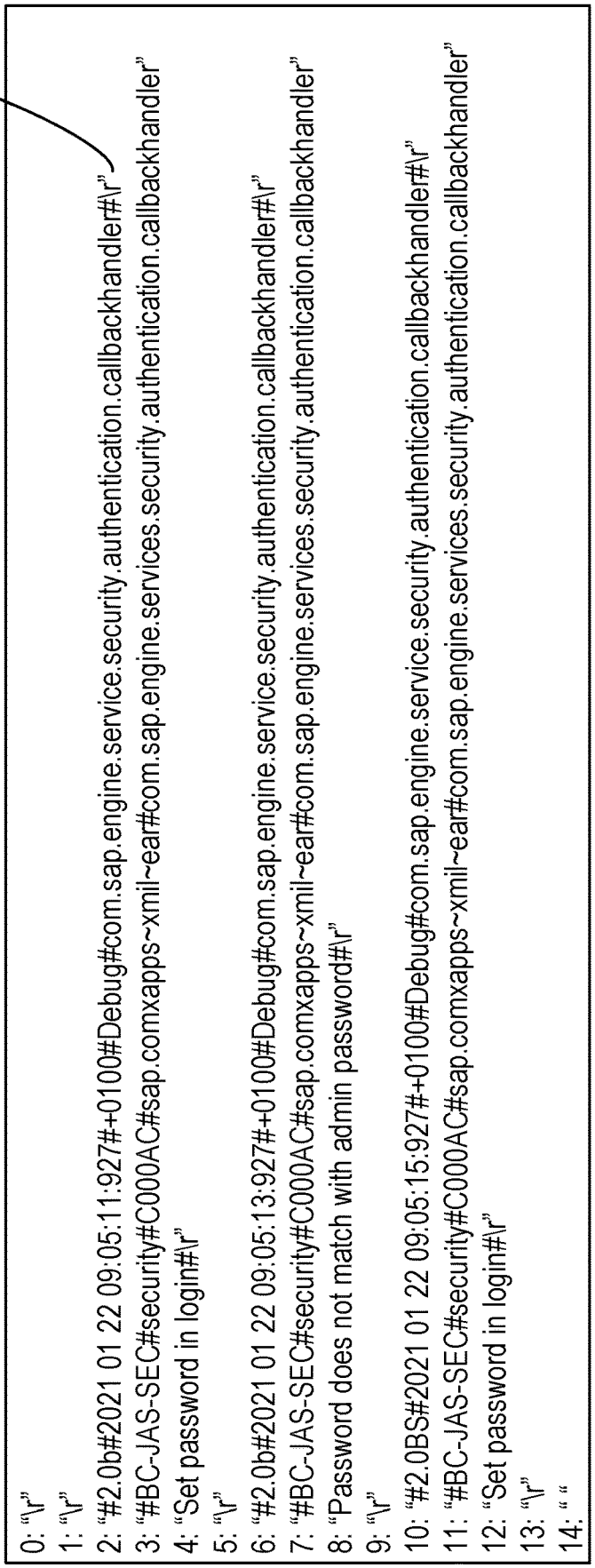
FIG. 4 illustrates example data of a log file in semi-structured form.

In some example embodiments, the analysis module 210 is configured to split the raw data of the log file into single line log entries using delimiters that specify the boundaries between separate, independent regions of the raw data. FIG. 4 illustrates example data 400 of a log file in semi-structured form. In FIG. 4, the raw data of the log file 300 in FIG. 3 has been converted by the analysis module 210 into the data 400, which comprises single line log entries. This conversion of the raw data into single line entries in semi-structured form prepares the data for further processing by the analysis module 210.

By applying suitable delimiters, the analysis module 210 ensures that segments of each log entry are carefully inserted in appropriate fields to form semi-structured data. Next, the analysis module 210 may divide the semi-structured data into tokens to enable accurate analysis on the log file. In natural language processing, tokenization refers to breaking text into sentences and words. In some example embodiments, tokenization is performed by the analysis module 210 to extract various information from the log entries regarding details of the log entries, such as a date and time of log activity occurrence, a severity of the log activity, a component or module where the log activity occurred, user information identifying a user associated with the log activity, a thread identification of the processing thread where the log activity occurred, and a message indicating the nature or type of log activity. FIG. 5 illustrates example data 510, 520, and 530 extracted from a log file. In FIG. 5, the data 510, 520, and 530 has been extracted from the single line log entries of the data 400 of FIG. 4. As seen in FIG. 5, the analysis module 210 may extract error messages from the data 400 and remove any numbers or special characters from the error messages that may not be useful in natural language processing. For example, in FIG. 5, the analysis module 210 has extracted the error message "set password in login #\r" and stored this raw form of the error message in one field (e.g., in the field labeled "NonGrpError" in FIG. 5), as well as storing an edited version of the error message in another field (e.g., in the field labeled "Error" in FIG. 5). The edited version in FIG. 5 reads "set password in login \r" and was generated by the analysis module 210 by removing the "#" character from the raw form of the error message.

In some example embodiments, the analysis module 210 is configured to filter out data from the extracted data based on one or more filter criteria specified by the user. For example, the analysis module 210 may filter out any log entries that do not satisfy the user-specified filter criteria. Examples of filter criteria include, but are not limited to, a user-specified component from which the corresponding error message of the log entry originated, a user-specified date range within which the log entry was recorded in the log file, a user-specified time range within which the log entry was recorded in the log file, one or more users-specified keywords included in the log entry, a user-specified severity level, a user-specified thread that was used to perform a task when the log entry was recorded in the log file, and a user-specified identification of another user included in the log entry. Other types of filter criteria are also within the scope of the present disclosure.

Each log file may contain thousands of log entries that are often the same except for having occurred at different time periods. In some example embodiments, in order to make the analysis of the log entries faster and more efficient, the analysis module 210 may group all similar semi-structured log entries together. For example, the analysis module 210 may group all log entries having the same error together. FIG. 6 illustrates an example of data extracted from a log file being grouped together. In FIG. 6, the analysis module 210 has grouped together the data 510 and 530 from FIG. 5 into a group 610 based on the log entries of the data 510 and 530 having the same error "set password in login \r" and has put the data 520 from FIG. 5 in a group 620, with the group 610 having two entries and the group 620 having only a single entry.

In some example embodiments, after dividing the log entries into groups as discussed above, the analysis module 210 identifies a set of unique words from the groups of log entries. The analysis module 210 may identify the set of words from the error messages of the groups of log entries. In one example, the following table comprises the error messages from which the set of words is identified.

| Error 1 | Set password in login |
|---|---|
| Error 2 | Password does not match with admin password |

The analysis module 210 may generate a set of all unique words from the error messages of the log entries using a bag-of-words model on the error fields of the grouped plurality of log entries. A bag-of-words model is a simplifying representation in which a text is represented as the multiset of its words, disregarding grammar and even word order, but keeping multiplicity.

In some example embodiments, the analysis module 210 is configured to, for each error message in the error messages of the plurality of log entries, compute a corresponding term-frequency vector based on a corresponding frequency of occurrence for each unique word of the set of unique words in the error message. For the example error messages "Error 1" and "Error 2" in the table above, the following term-frequency table is shown below for each error message:

|         | set | password | in | login | does | not | match | with | admin |
|---------|-----|----------|----|-------|------|-----|-------|------|-------|
| Error 1 | 1   | 1        | 1  | 1     | 0    | 0   | 0     | 0    | 0     |
| Error 2 | 0   | 2        | 0  | 0     | 1    | 1   | 1     | 1    | 1     |

Using the example term-frequency table above, the analysis module 210 may generate the following term-frequency vectors for the error messages:

Error 1: [1, 1, 1, 1, 0, 0, 0, 0, 0]
Error 2: [0, 2, 0, 0, 1, 1, 1, 1, 1]

In some example embodiments, the analysis module 210 is configured to, for each error message in the error messages of the plurality of log entries, compute a corresponding similarity measure between the term-frequency vectors of the error message and every other error message of the plurality of log entries. For example, the analysis module 210 may compute a corresponding cosine similarity between the term-frequency vectors of the error message and every other error message of the plurality of log entries. A cosine similarity is a measure of similarity between two non-zero vectors of an inner product space, and it is defined to equal the cosine of the angle between them, which is also the same as the inner product of the same vectors normalized to both have length 1. Other similarity measures are also within the scope of the present disclosure.

In some example embodiments, the analysis module 210 is configured to, for each error message in the error messages of the plurality of log entries, compute a corresponding score based on a sum of the corresponding similarity measures between the term-frequency vectors of the error message and every other error message of the plurality of log entries. For example, in a scenario where there are five error messages M1, M2, M3, M4, and M5, and $S_{xy}$ represents the similarity measure between the term-frequency vectors of error message x and error message y, the sum of the corresponding similarity measures between the term-frequency vectors of error message M1 and every other error message is represented as follows:

$$\text{Sum} = S_{M1M2} + S_{M1M3} + S_{M1M4} + S_{M1M5}.$$

Figure 7:
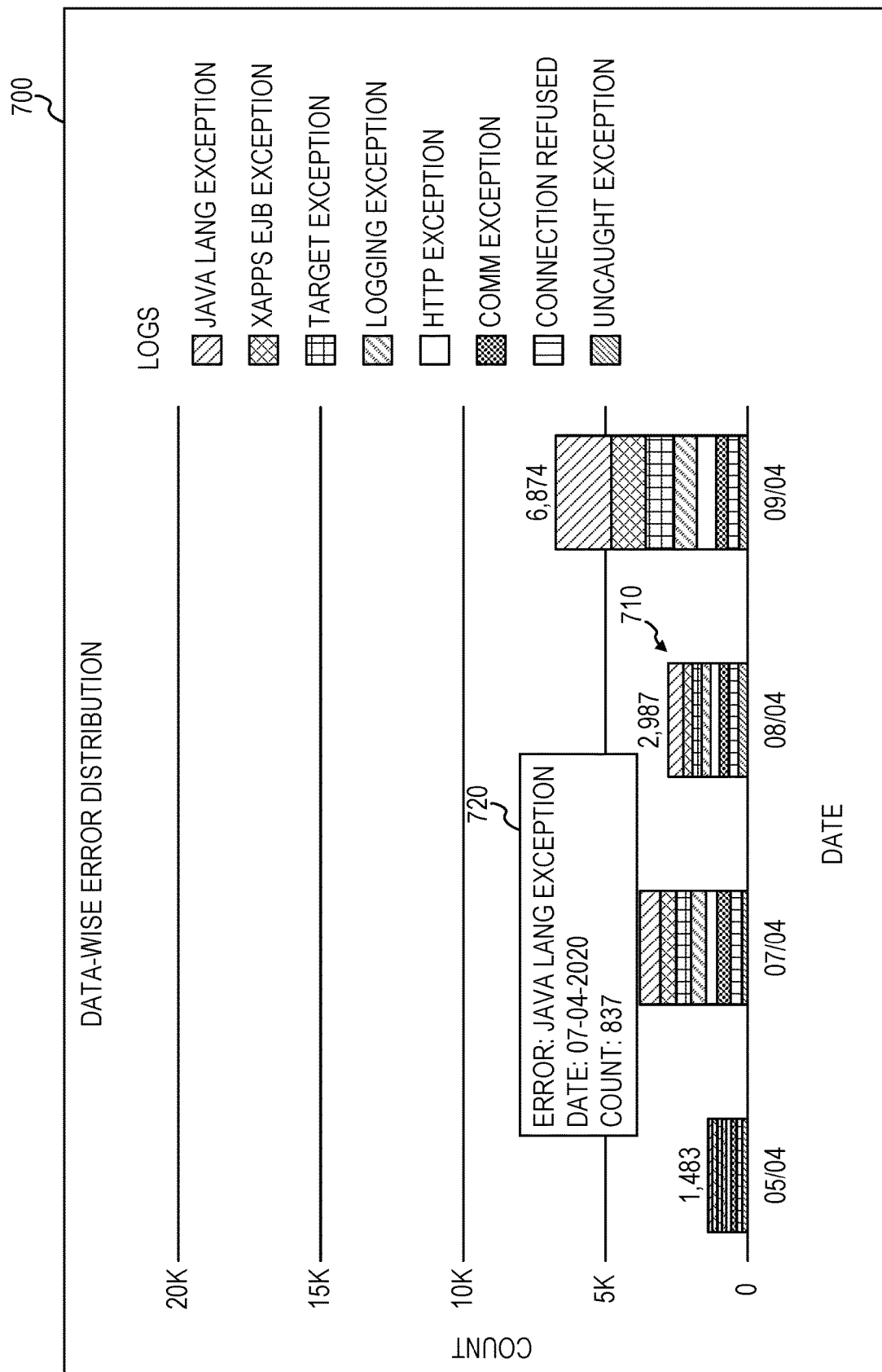
FIG. 7 illustrates an example graphical user interface (GUI) in which a frequency distribution of error messages is displayed.

The interface module 220 may be configured to display a visualization of the log entries, including analytic data regarding the log entries. For example, the interface module 220 may display a frequency distribution of the error messages of the log entries in order to provide the user with insight as to the frequency at which each error is occurring. FIG. 7 illustrates an example graphical user interface (GUI) 700 in which a frequency distribution of error messages is displayed. In FIG. 7, the GUI 700 includes a chart in which a corresponding count 710 of occurrences of each type of error is plotted along an X-axis of dates. In the example shown in FIG. 7, a stack 710 of slices representing the different errors that occurred is displayed for each date of occurrence. Each slice of the stack 710 may be configured to, in response to its selection, trigger a display of a user interface element 720 that includes details about the corresponding error of the selected slice, such as the type of error, the date on which the error occurred, and the number of times the error occurred on that date.

Figure 8:
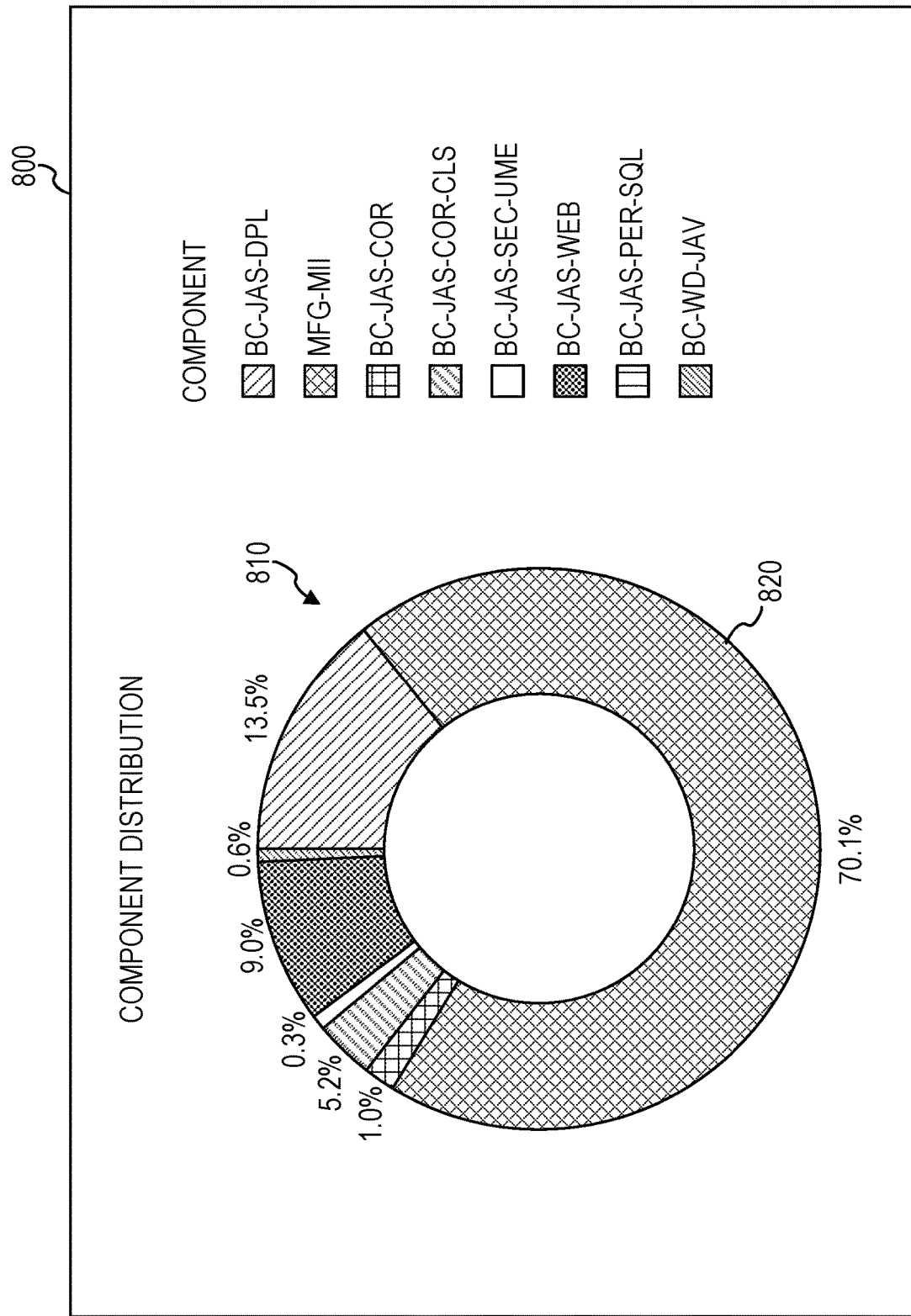
FIG. 8 illustrates an example GUI in which a distribution of the plurality of log entries by components present in the plurality of log entries is displayed.

In some example embodiments, the interface module 220 is configured to display a distribution of log entries by components that are present in the log entries. FIG. 8 illustrates an example GUI 800 in which a distribution 810 of the plurality of log entries by components present in the plurality of log entries is displayed. In FIG. 8, the distribution 810 is displayed as a pie chart in which slices 820 of the pie chart correspond to the portion of the log entries that are attributable to a particular component. The distribution 810 of the plurality of log entries may be organized by other entities as well, such as by users present in the plurality of log entries.

Figure 9:
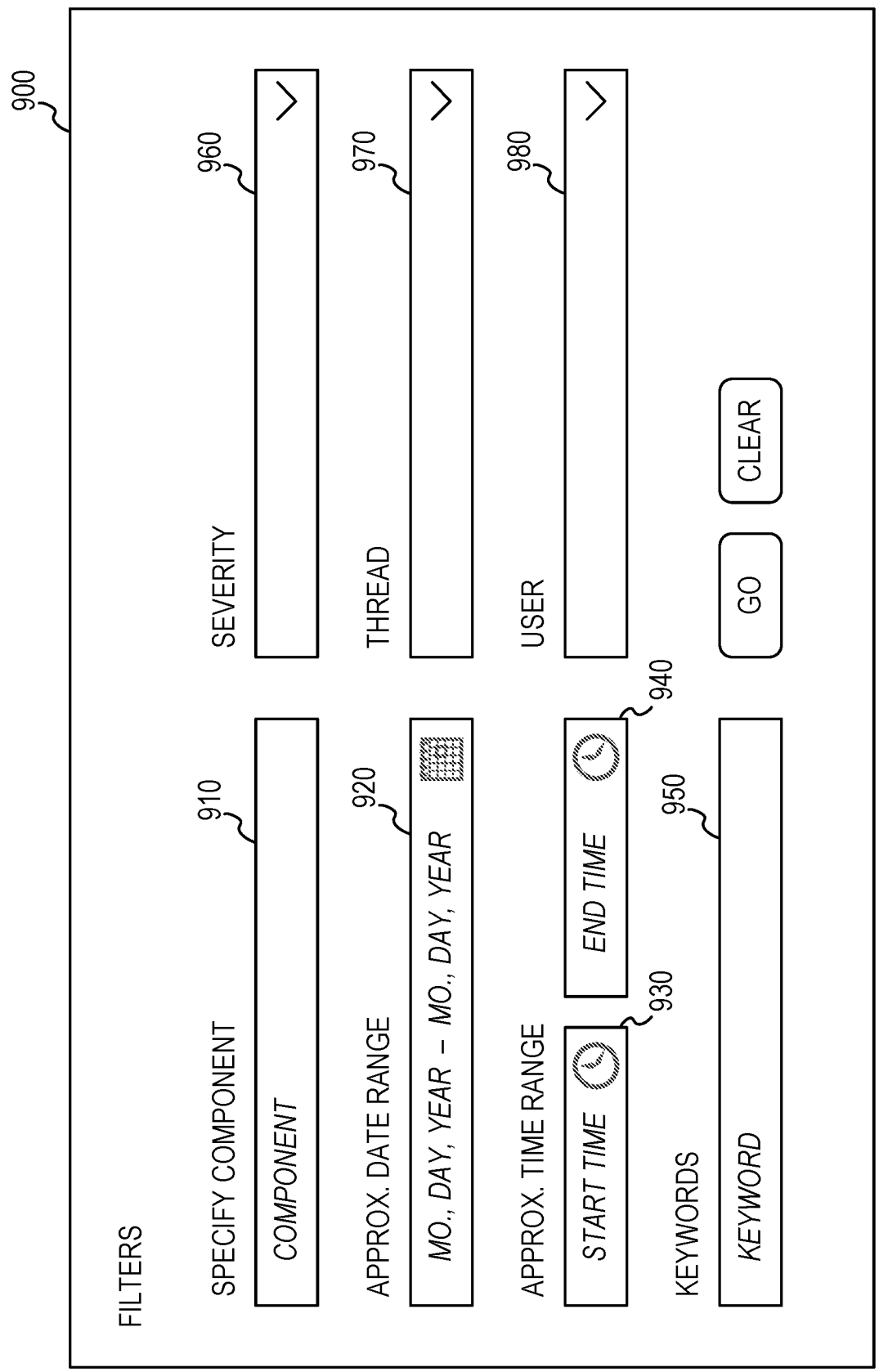
FIG. 9 illustrates an example GUI in which filter criteria may be input by a user is displayed.

In some example embodiments, the interface module 220 is configured to display a GUI in which a user may input one or more filter criteria for use in analyzing the log entries. FIG. 9 illustrates an example GUI 900 in which filter criteria may be input by a user is displayed. For example, the GUI 900 may include a field 910 in which the user may specify one or more components, a field 920 in which the user may specify a date range, field 930 and 940 in which the user may specify a time range (e.g., a start time and an end time), a field 950 in which the user may specific one or more keywords, a field 960 in which the user may specify a severity, a field 970 in which the user may specify one or more threads, and a field 980 in which the user may specify one or more users.

Figure 10:
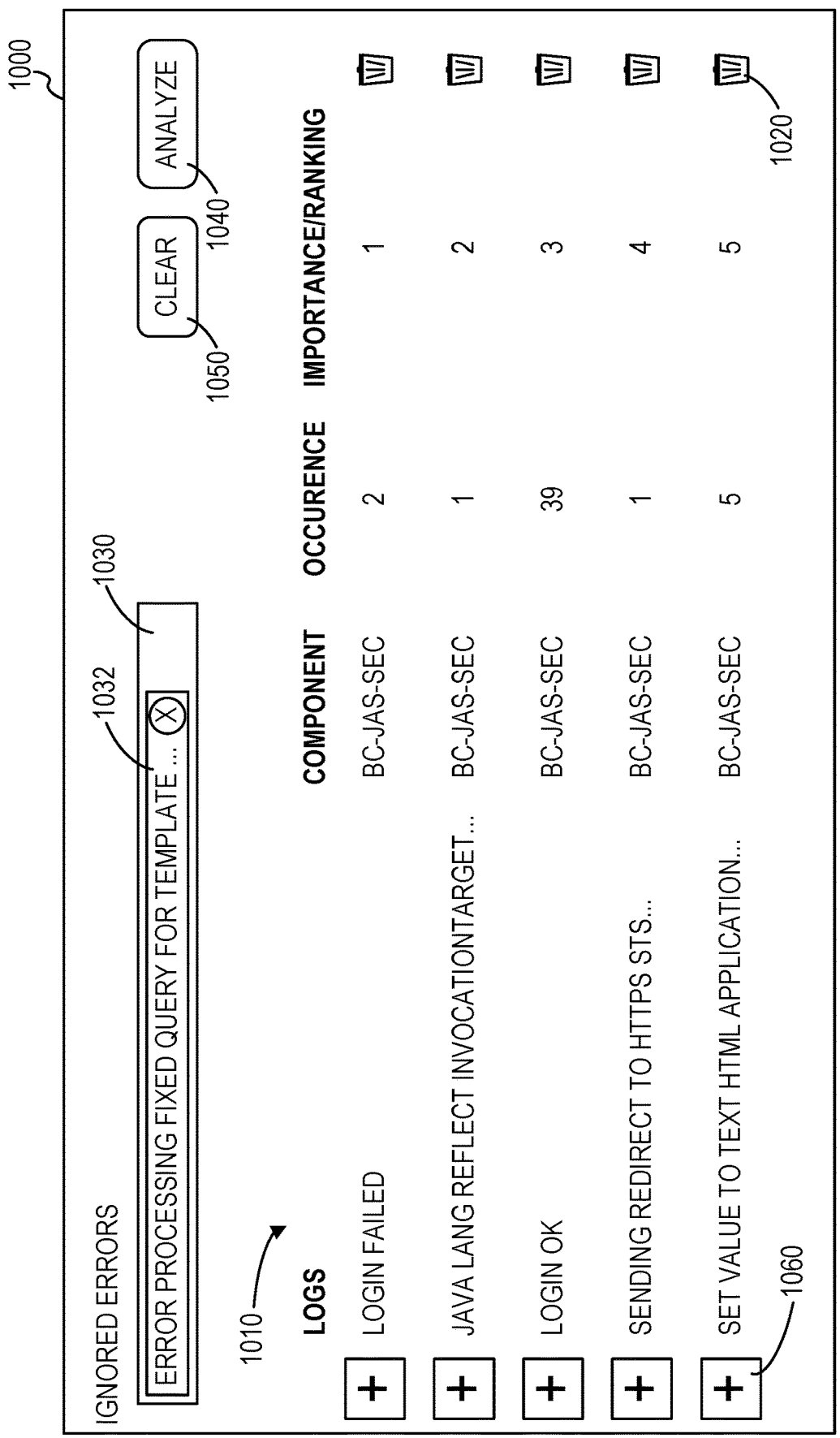
FIG. 10 illustrates an example GUI in which a ranked list of log entries is displayed.

In some example embodiments, the interface module 220 is configured to display an indication of one or more of the error messages of the plurality of log entries on a computing device based on the corresponding scores for the one or more of the error messages of the plurality of log entries. The interface module 220 may rank the error messages of the plurality of log entries based on their corresponding scores, and then display the indication of the one or more of the error messages of the plurality of log entries based on the ranking. FIG. 10 illustrates an example GUI 1000 in which a ranked list 1010 of log entries is displayed. The interface module 220 may rank the error messages in inverse relationship to their scores, such that the lower the score of an error message, the higher the ranking of the error message, and the higher the score of an error message, the lower the ranking of the error message, since a lower score based on similarity represents a greater probability that the error message is anomalous. The interface module 220 may then display the indications of the error messages in descending order of their ranking (e.g., the highest ranking and most anomalous error message being displayed in a topmost position, the second highest ranking error message being displayed in a second position directly under the highest ranking error message, and so on and so forth).

In FIG. 10, the interface module 220 displays a corresponding selectable user interface element 1020 in association with each indication of an error messages in the ranked list 1010. In some example embodiments, in response to the user selecting a selectable user interface element 1020, the analysis module 210 removes the corresponding log entry from the ranked list 1010 and modifies the plurality of log entries to exclude the log entry corresponding to the selected user interface element 1020. The analysis module 210 may then recalculate the term-frequency vectors, similarity measures, and scores using the modified plurality of log entries. An indication of the excluded log entry 1032 may be displayed in a field 1030 of the GUI 1000 in response to the user selecting the corresponding user interface element 1020. If the user wants to recalculate the frequency vectors, similarity measures, and scores without the excluded log entry 1032, then the user may select a user interface element 1040. If the user wants to include the excluded log entry 1032 back into the calculation and analysis, then the user may select a user interface element 1050.

In some example embodiments, the interface module 220 displays a corresponding user interface element 1060 for each indication of an error message in the ranked list 1010. The interface module 220 may be configured to, in response to the user selecting the user interface element 1060, display log details of the log entry corresponding to the selected user interface element 1060. FIG. 11 illustrates an example GUI 1100 in which log details 1120 of a log entry are displayed. The GUI 1100 may also include a corresponding date and time for each instance of log details 1120. Additionally, the interface module 220 may also display a corresponding user interface element 1130 for each instance of log details 1120. The interface module 220 may be configured to, in response to the user selecting the user interface element 1130, display a stack trace of the log entry corresponding to the selected user interface element 1130. FIG. 12 illustrates an example GUI 1200 in which a stack trace is displayed. A stack trace is a report of the active stack frames at a certain point in time during the execution of a program. Stack frames may contain subroutine state information, and each stack frame may correspond to a call to a subroutine.

Figure 13:
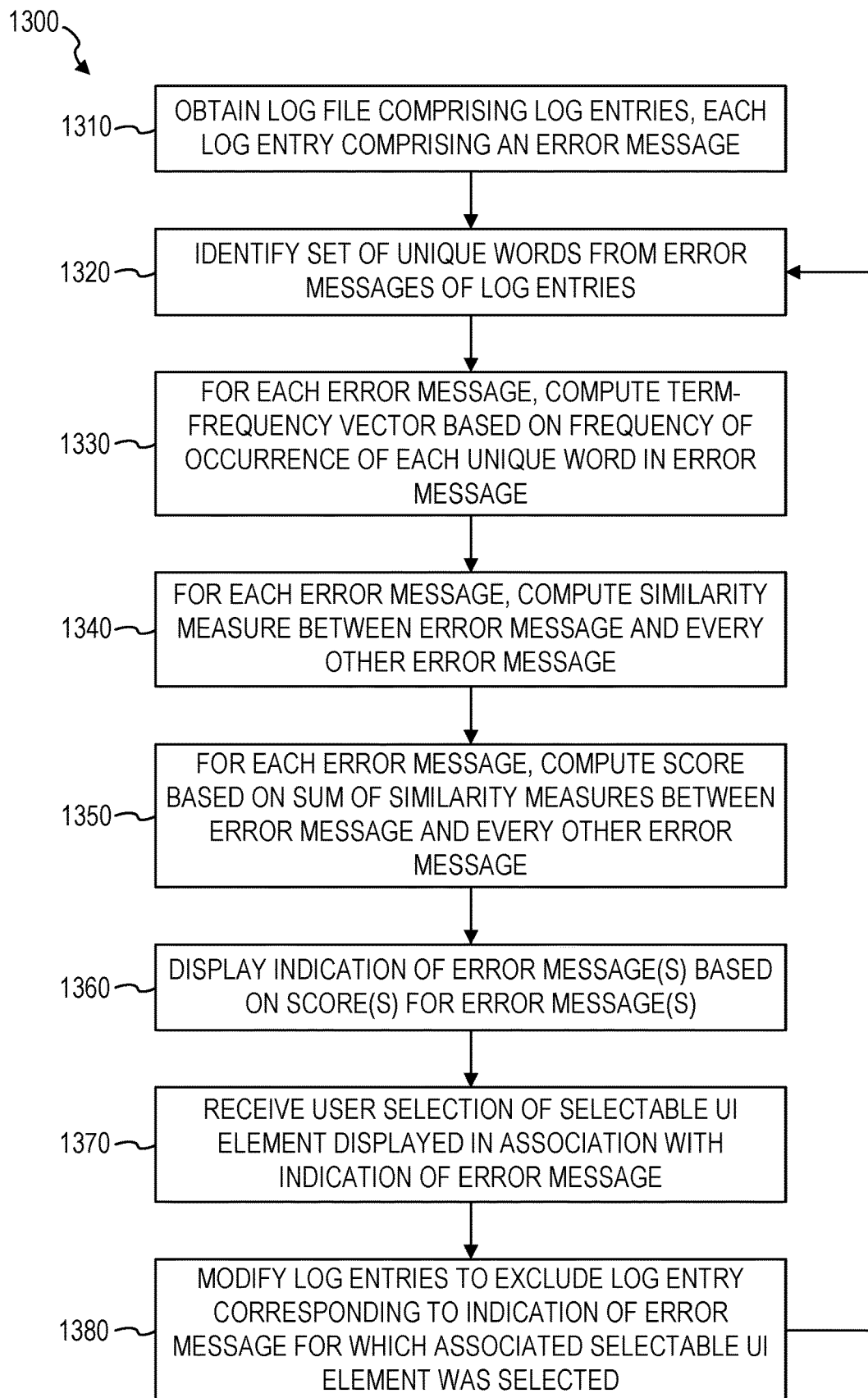
FIG. 13 is a flowchart illustrating an example process of log analysis.

FIG. 13 is a flowchart illustrating an example method 1300 of log analysis. The method 1300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1300 are performed by the log analysis system 200 of FIG. 2, or any combination of one or more of its components (e.g., the analysis module 210, the interface module 220).

At operation 1310, the log analysis system 200 obtains a log file comprising a plurality of log entries. In some example embodiments, each log entry in the plurality of log entries comprises a corresponding error message. The log analysis system 200 may comprise a client-side software tool running on the computing device. However, other implementations (e.g., server-side) of the log analysis system 200 are also within the scope of the present disclosure.

Next, the log analysis system 200 may, at operation 1320, identify a set of unique words from the error messages of the plurality of log entries. In some example embodiment, identifying the set of unique words from the error messages of the plurality of log entries comprises selecting the plurality of log entries for use in identifying the set of unique words based on a determination that each log entry in the plurality of log entries satisfies one or more filter criteria input by a user. The one or more filter criteria may comprise one or more of the following criteria: a user-specified component from which the corresponding error message of the log entry originated; a user-specified date range within which the log entry was recorded in the log file; a user-specified time range within which the log entry was recorded in the log file; one or more users-specified keywords included in the log entry; a user-specified severity level; a user-specified thread that was used to perform a task when the log entry was recorded in the log file; or a user-specified identification of another user included in the log entry.

Then, at operation 1330, for each error message in the error messages of the plurality of log entries, the log analysis system 200, may compute a corresponding term-frequency vector based on a corresponding frequency of occurrence for each unique word of the set of unique words in the error message. Each unique word in the set of unique words has a corresponding term-frequency vector that is based on how often the unique word occurs in the error message.

At operation 1340, the log analysis system 200 may, for each error message in the error messages of the plurality of log entries, compute a corresponding similarity measure between the term-frequency vectors of the error message and every other error message of the plurality of log entries. For example, the log analysis system 200 may compute a corresponding cosine similarity between the error message and every other error message of the plurality of log entries. A cosine similarity is a measure of similarity between two non-zero vectors of an inner product space, and it is defined to equal the cosine of the angle between them, which is also the same as the inner product of the same vectors normalized to both have length 1. Other similarity measures are also within the scope of the present disclosure.

At operation 1350, for each error message in the error messages of the plurality of log entries, the log analysis system 200 may compute a corresponding score based on a sum of the corresponding similarity measures between the term-frequency vectors of the error message and every other error message of the plurality of log entries. For example, in a scenario where there are five error messages M1, M2, M3, M4, and M5, and $S_{xy}$ represents the similarity measure between error message x and error message y, the sum of the corresponding similarity measures between error message M1 and every other error message is represented as follows:

$$\text{Sum} = S_{M1M2} + S_{M1M3} + S_{M1M4} + S_{M1M5}.$$

At operation 1360, the log analysis system 200 may then display an indication of one or more of the error messages of the plurality of log entries on a computing device based on the corresponding scores for the one or more of the error messages of the plurality of log entries. In some example embodiments, the log analysis system 200 ranks the error messages of the plurality of log entries based on their corresponding scores, and then displays the indication of the one or more of the error messages of the plurality of log entries based on the ranking. For example, the log analysis system 200 may rank the error messages in inverse relationship to their scores, such that the lower the score of an error message, the higher the ranking of the error message, and the higher the score of an error message, the lower the ranking of the error message, since a lower score based on similarity represents a greater probability that the error message is anomalous. The log file system 300 may then display the indications of the error messages in descending order of their ranking (e.g., the highest ranking and most anomalous error message being displayed in a topmost position, the second highest ranking error message being displayed in a second position directly under the highest ranking error message, and so on and so forth).

Then, at operation 1370, the log analysis system 200 may receive, from the computing device, a user selection of a selectable user interface element displayed in association with the corresponding indication of one of the one or more of the error messages of the plurality of log entries. For example, the user may select the corresponding selectable user interface element 1020, and then select the selectable user interface element 1040, as discussed above with respect to FIG. 10.

Next, the log analysis system 200, in response to the receiving the user selection, may modify the plurality of log entries to exclude the log entry corresponding to the indication of the one or more of the error messages for which the associated selectable user interface element was selected via the user selection, at operation 1380. The method 1300 may then repeat the analysis, returning to operation 1320, where the log analysis system 200 identifies a set of unique words from error messages of the modified plurality of log entries that no longer includes the log entry corresponding to the indication of the one or more of the error messages for which the associated selectable user interface element was selected.

It is contemplated that any of the other features described within the present disclosure can be incorporated into the method 1300.

Figure 14:
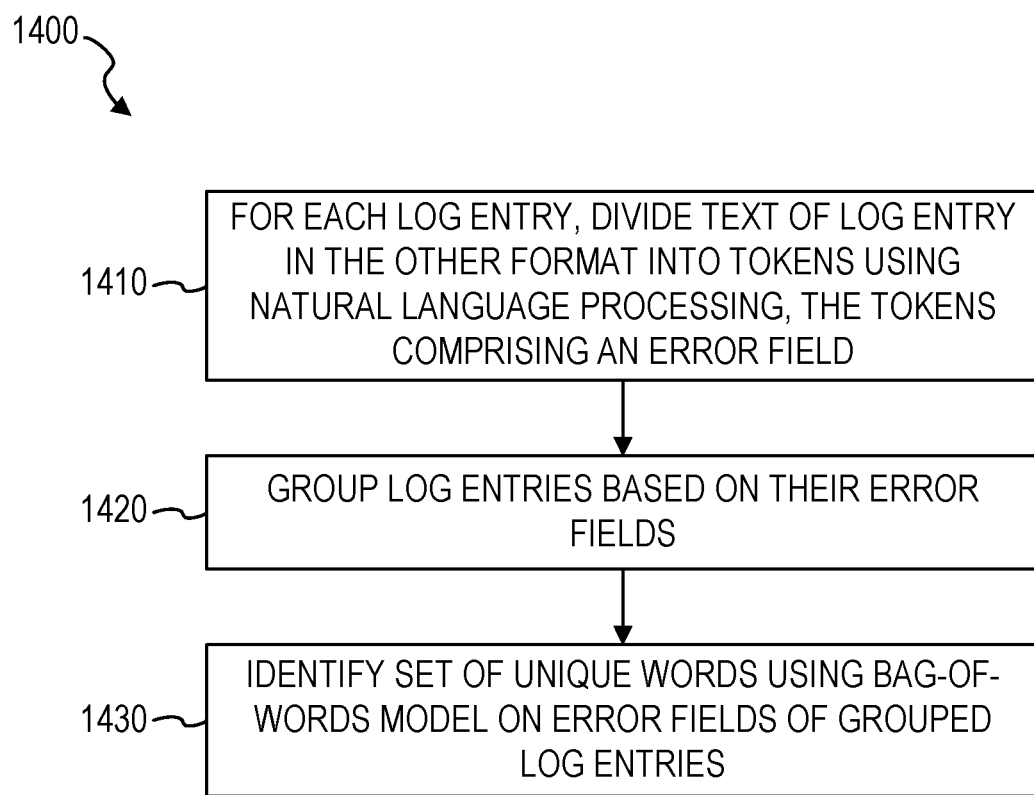
FIG. 14 is a flowchart illustrating an example process of identifying a set of unique words from error messages of log entries.

FIG. 14 is a flowchart illustrating an example method 1400 of identifying a set of unique words from error messages of log entries. The method 1400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1400 are performed by the log analysis system 200 of FIG. 2, or any combination of one or more of its components (e.g., the analysis module 210, the interface module 220).

At operation 1410, the log analysis system 200 may, for each log entry in the plurality of log entries, divide text of the log entry into a plurality of tokens using natural language processing. For example, the log analysis system 200 may extract the tokens from the log entries using the techniques discussed above with respect to FIG. 6. In some example embodiments, the plurality of tokens comprises an error field.

Next, at operation 1420, the log analysis system 200 may group the plurality of log entries based on their error fields. For example, the log analysis system 200 may divide the plurality of log entries into groups using the techniques discussed above with respect to FIG. 6.

The log analysis system 200 may then identify the set of unique words using a bag-of-words model on the error fields of the grouped plurality of log entries, at operation 1430.

It is contemplated that any of the other features described within the present disclosure can be incorporated into the method 1400.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: obtaining a log file comprising a plurality of log entries, each log entry in the plurality of log entries comprising a corresponding error message; identifying a set of unique words from the error messages of the plurality of log entries; for each error message in the error messages of the plurality of log entries, computing a corresponding term-frequency vector based on a corresponding frequency of occurrence for each unique word of the set of unique words in the error message; for each error message in the error messages of the plurality of log entries, computing a corresponding similarity measure between the term-frequency vectors of the error message and every other error message of the plurality of log entries; for each error message in the error messages of the plurality of log entries, computing a corresponding score based on a sum of the corresponding similarity measures between the term-frequency vectors of the error message and every other error message of the plurality of log entries; and displaying an indication of one or more of the error messages of the plurality of log entries on a computing device based on the corresponding scores for the one or more of the error messages of the plurality of log entries.

Example 2 includes the computer-implemented method of example 1, wherein the computer system comprises a client-side software tool running on the computing device.

Example 3 includes the computer-implemented method of example 1 or example 2, wherein the identifying the set of unique words from the error messages of the plurality of log entries comprises: for each log entry in the plurality of log entries, dividing text of the log entry into a plurality of tokens using natural language processing, the plurality of tokens comprising an error field; grouping the plurality of log entries based on their error fields; and identifying the set of unique words using a bag-of-words model on the error fields of the grouped plurality of log entries.

Example 4 includes the computer-implemented method of any one of examples 1 to 3, wherein identifying the set of unique words from the error messages of the plurality of log entries comprises selecting the plurality of log entries for use in the identifying the set of unique words based on a determination that each log entry in the plurality of log entries satisfies one or more filter criteria input by a user, the one or more filter criteria comprising: a user-specified component from which the corresponding error message of the log entry originated; a user-specified date range within which the log entry was recorded in the log file; a user-specified time range within which the log entry was recorded in the log file; one or more users-specified keywords included in the log entry; a user-specified severity level; a user-specified thread that was used to perform a task when the log entry was recorded in the log file; or a user-specified identification of another user included in the log entry.

Example 5 includes the computer-implemented method of any one of examples 1 to 4, wherein the displaying the indication of the one or more of the error messages of the plurality of log entries on the computing device comprises: ranking the error messages of the plurality of log entries based on their corresponding scores; and displaying the indication of the one or more of the error messages of the plurality of log entries based on the ranking.

Example 6 includes the computer-implemented method of any one of examples 1 to 5, further comprising: receiving, from the computing device, a user selection of a selectable user interface element displayed in association with the corresponding indication of one of the one or more of the error messages of the plurality of log entries; and in response to the receiving the user selection: modifying the plurality of log entries to exclude the log entry corresponding to the indication of the one of the one or more of the error messages for which the associated selectable user interface element was selected via the user selection; identifying another set of unique words from the error messages of the modified plurality of log entries; for each error message in the error messages of the modified plurality of log entries, computing another corresponding term-frequency vector based on another corresponding frequency of occurrence for each unique word of the other set of unique words in the error message; for each error message in the error messages of the modified plurality of log entries, computing another corresponding similarity measure between the error message and every other error message of the modified plurality of log entries; for each error message in the error messages of the modified plurality of log entries, computing another corresponding score based on another sum of the other corresponding similarity measures between the error message and every other error message of the modified plurality of log entries; and displaying another indication of one or more of the error messages of the modified plurality of log entries on the computing device based on the other corresponding scores for the one or more of the error messages of the modified plurality of log entries.

Example 7 includes the computer-implemented method of any one of examples 1 to 6, further comprising: receiving, from the computing device, a user selection of a selectable user interface element displayed in association with the corresponding indication of one of the one or more of the error messages of the plurality of log entries; and in response to the receiving the user selection, displaying log details of the log entry corresponding to the indication of the one of the one or more of the error messages for which the associated selectable user interface element was selected via the user selection.

Example 8 includes the computer-implemented method of any one of examples 1 to 7, further comprising: receiving, from the computing device, a user selection of a selectable user interface element displayed in association with the corresponding indication of one of the one or more of the error messages of the plurality of log entries; and in response to the receiving the user selection, displaying a stack trace of the log entry corresponding to the indication of the one of the one or more of the error messages for which the associated selectable user interface element was selected via the user selection.

Example 9 includes the computer-implemented method of any one of examples 1 to 8, further comprising displaying, on the computing device, a frequency distribution of the error messages of the plurality of log entries by date.

Example 10 includes the computer-implemented method of any one of examples 1 to 9, further comprising displaying, one the computing device, a distribution of the plurality of log entries by components present in the plurality of log files.

Example 11 includes the computer-implemented method of any one of examples 1 to 10, further comprising displaying, by the computing device, a distribution of the plurality of log entries by users present in the plurality of log files.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 15:
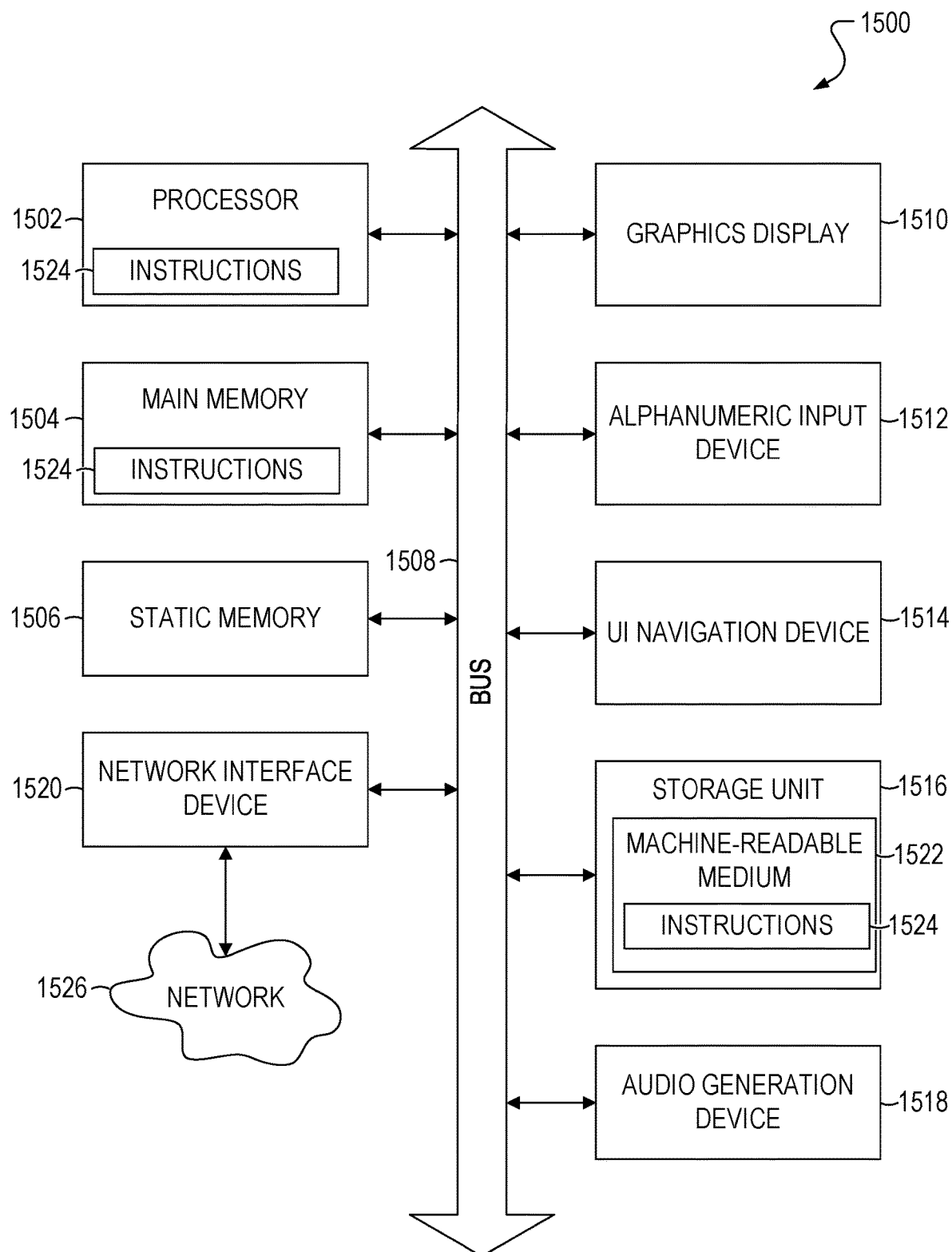
FIG. 15 is a block diagram of an example computer system on which processes described herein can be executed.

FIG. 15 is a block diagram of a machine in the example form of a computer system 1500 within which instructions 1524 cause the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504, and a static memory 1506, which communicate with each other via a bus 1508. The computer system 1500 may further include a graphics or video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a storage unit (e.g., a disk drive unit) 1516, an audio or signal generation device 1518 (e.g., a speaker), and a network interface device 1520.

The storage unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504, and the processor 1502 also constituting machine-readable media. The instructions 1524 may also reside, completely or at least partially, within the static memory 1506.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Figure 16:
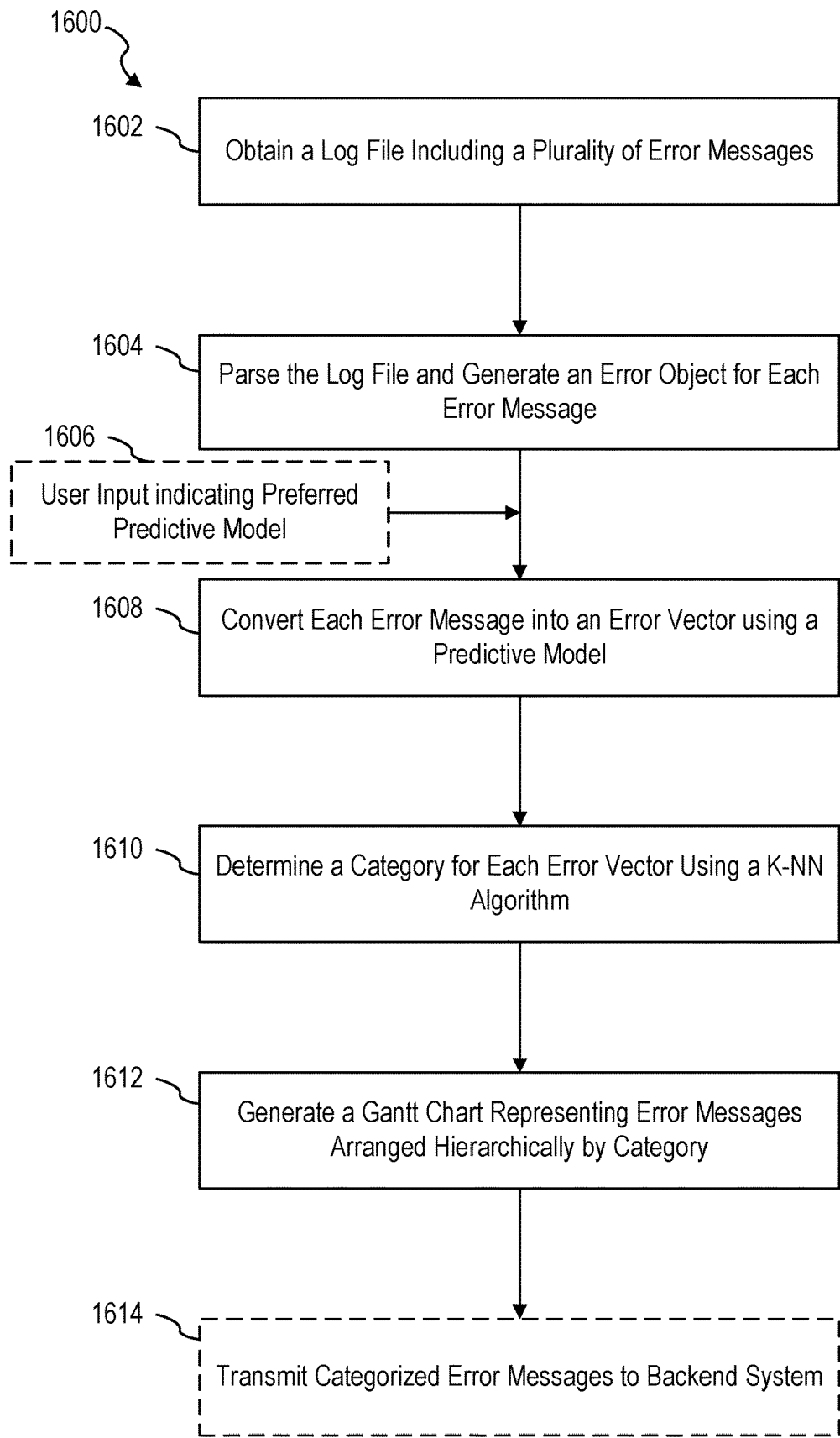
FIG. 16 is a flowchart illustrating an example process for categorizing error messages.

FIG. 16 is a flowchart illustrating an example process for categorizing error messages. The process 1600 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the process 1600 are performed by the log analysis system 200 of FIG. 2 or any combination of one or more of its components (e.g., the analysis module 210, the interface module 220).

At 1602, a log file is obtained that includes a plurality of error messages. The log file can be similar to, or different from the example log file illustrated in FIG. 3 and can include hundreds, thousands, or more log entries (e.g., Entry 310 of FIG. 3), which describe events that have previously occurred in executing software.

At 1604, the log file is parsed into an error object for each error message. These error objects can include extracted data (e.g., extracted data 510 of FIG. 5) and grouped data (e.g., grouped data 610 of FIG. 6). In general, each error object represents a unique occurrence of an error, and includes attributes such as date, time, thread, operating condition of the device at the time of the error (e.g., CPU utilization, memory utilization etc.), and a text phrase associated with the error. In some implementations, 1604 is skipped entirely, and error messages from the log file are directly converted into error vectors (as described below with respect to 1608) from raw form.

The system can automatically select a predictive model based one or more performance indicators. For example, a topic coherence score associated with the error can provide a predicted accuracy score which can be used to select which predictive model (e.g., Sent2Vec or N-Gram) to use. Other suitable performance measures or accuracy indicators such as sentiment classification score, or sentence similarly, can be used to select the predictive model. In some implementations both predictive models can be executed, and an analysis can be performed to determine which one to use for similar errors in the future.

In some implementations, at 1606, the user can (optionally) input (e.g., via interface module 220 of FIG. 2) a preferred predictive model to be used for error vector generation. In some implementations, the user can specify additional parameters associated with the preferred predictive model. For example, where the user has specified an N-gram predictive model, they can further specify a number or type of grams to use. In another example, where the user has selected the Sent2Vec Algorithm, they may further specify a sampling threshold, or a minimal number of label occurrences, or other parameter.

At 1608, each error message is converted into an error vector, using a predictive model. The predictive model can be selected by the user (e.g., in 1606) or a default model or combination of models can be used. At a high level, the predictive model ingests a text phrase, such as a text error message, and produces a vector (e.g., a 1 by 32 array of integers) that represents the text phrase and is suitable for input to further machine learning algorithms. In some instances, these error vectors are known as embeddings.

One suitable predictive model can be an N-gram language model. The N-gram model generates a vocabulary of phrases by splitting a text phrase into grams. For example, a bigram model (N=2) splits the text phrase into groups of two, so "the quick brown fox" becomes "the quick", "quick brown", and "brown fox." For the same phrase, a trigram model (N=3) would result in "the quick brown", and "quick brown fox." In some implementations, for a given set of errors (e.g., all of the errors in the obtained error log), a full vocabulary of bigrams and trigrams can be generated. Then, when analyzing a text phrase or error message, a frequency of each gram or symbol occurring within the message can be identified for every bigram and trigram, and can be used to generate a vector for each error. In this way, error messages with similar text phrases or symbols will yield vectors that are in similar locations within the vector space.

Another suitable predictive model can be the Sent2Vec Model. Send2Vec is a general-purpose, unsupervised, sentence embedding model that extends the continuous bag-of-words models to include entire sentences. Generally, Sent2Vec is more computationally efficient than more complex neural network based predictive models, and therefore is suitable for operation locally (e.g., on log analysis system 200 of FIG. 2). It should be noted that the foregoing are merely examples, and any suitable predictive model is contemplated within the scope of this disclosure.

At 1610, the error vectors can be categorized using a K-nearest neighbor (K-NN) algorithm. The K-NN algorithm is a non-parametric, supervised learning classifier that uses proximity to make classifications or predictions regarding grouping of a data point relative to other data. The algorithm considers a number (K) of neighbors (nearby error vectors) for each error vector and assigns the error vector to a class based on relative distances to its neighbors. Distance can be calculated, for example, as Euclidean distance, Manhattan Distance, Minkowski distance, or other techniques.

The K-NN algorithm can be trained offline based on labeled data. The labeled data can include features and labels. Features are the vectors created from N-Gram Model and/or Sent2Vec Model at 1608, whereas labels are the different categories of log files identified. Since computations are performed based on numerical form, the labels can be converted to numeric form by encoding them. The K-NN classifier is then trained on input datasets by specifying the value of K. As a last step, the K-NN classifier is evaluated using a confusion matrix and other evaluation metrics such as accuracy, precision, recall, etc. In some implementations, the word embedding model (e.g., N-Gram or Sent2Vec) giving the relatively higher or highest accuracy is chosen to be displayed for the analysis. Once the model has been trained, it can be sent to the local system (e.g., log analysis system 200) for use. The model can then categorize errors in the error log.

Figure 17:
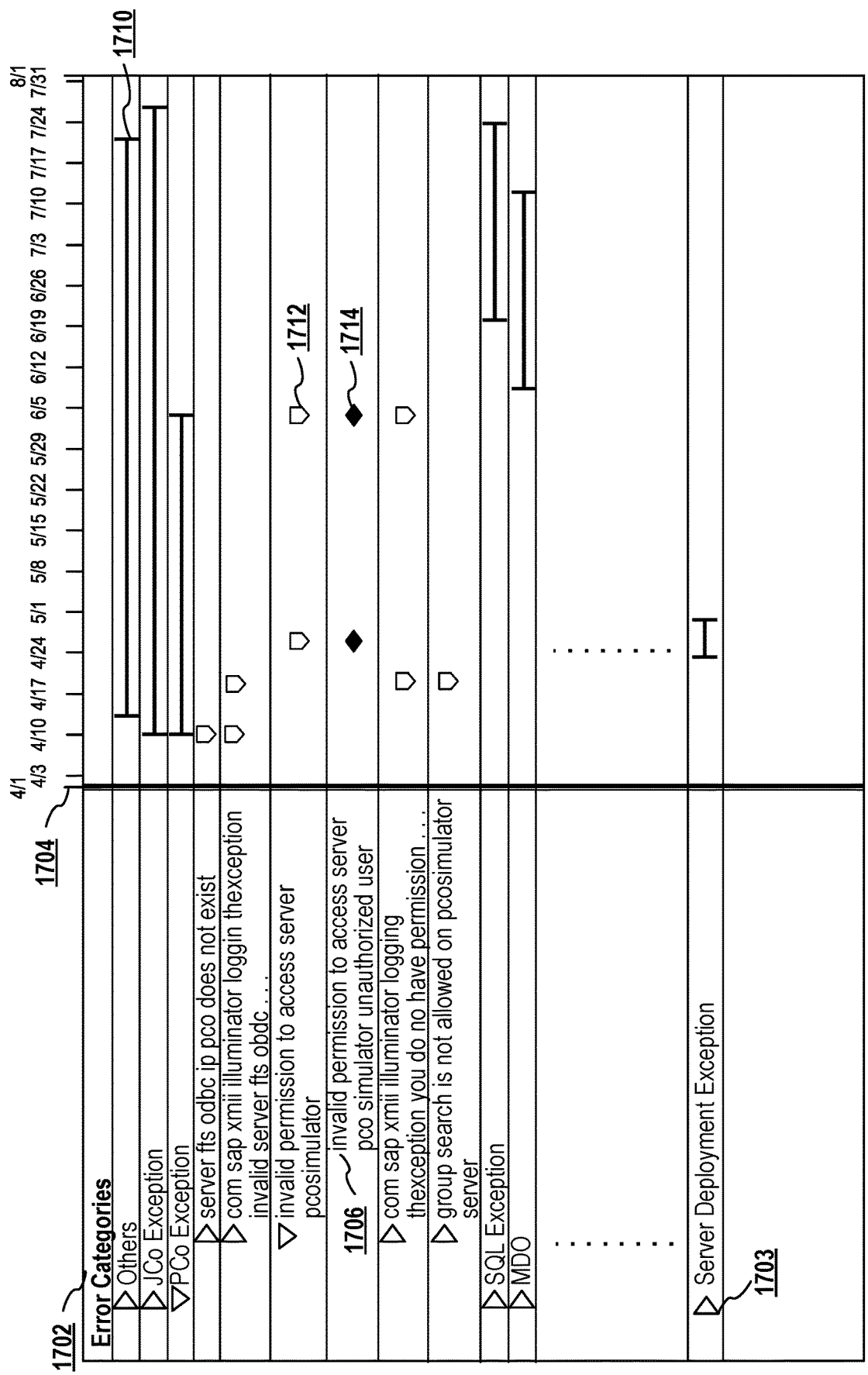
FIG. 17 illustrates an example GUI in which a Gantt chart displaying categorized error messages is displayed.

At 1612, a Gantt chart is generated, which represents the error messages arranged in a hierarchy according to their category. An example Gantt chart is illustrated in FIG. 17, described below. In some implementations, the individual error messages can be accessible using a drop down menu, or other GUI interface element, in order to view details about the error message. This Gantt chart view provides a user with a simplified timeline of log events, which can readily show time when certain events or combinations of events occurred for a given category.

At 1614, optionally and with consent of the user, the categorized error messages generated in 1612 can be transmitted to a backend system for use in future training or refinement of predictive models and/or the K-NN algorithm. In some implementations, the categorized error messages are transmitted in response to the user's request. In some implementations, a default setting prevents any storage of user data in backend systems, however the user can "opt-in" or otherwise indicate they consent to a portion of, or all of their data being anonymized and transmitted to the backend system. In some implementations, the categorized error messages are transmitted automatically, and the user can "opt-out" of sending messages. In some implementations, the system waits for a period of low network traffic (e.g., a scheduled 2:00 AM maintenance period) and transmits log files when the transmission will have a minimal impact on overall system performance.

FIG. 17 illustrates an example GUI in which a Gantt chart displaying categorized error messages is displayed. The GUI includes a menu of error categories which lists errors 1706 by category in a hierarchical view. The GUI further includes a timeline 1704 which indicates times during a time period when errors 1706 are present.

In some implementations, the error categories 1702 are presented with drop-down, or drill-down functionality. In the illustrated example, the error categories 1702 are presented in a hierarchical list that can be expanded or reduced as indicated by arrows, such as arrow 1703. While the illustrated example uses arrows, other GUI elements such as plus symbols, ellipsis or other symbols can be used.

The error categories 1702 can be generated by a categorization process (e.g., process 1600 of FIG. 16) which sorts errors from a log file into various categories. In the illustrated example, errors have been sorted, at the highest level into categories such as "others," "JCo exceptions," "PCo Exceptions," "SQL exceptions," "MDOs," and "Server Deployment Exceptions." These high level categories can each have a plurality of sub-categories which contain one or more errors, such as error 1706. Upon expanding or contracting one or more of the error categories 1702, the timeline portion 1704 of the GUI can update, illustrating the presence of errors at certain times or time intervals.

For categories containing multiple errors, or where the number of errors for a time period is greater than a predetermined threshold, one or more event bars 1710 can be displayed, indicating that errors of that category occur during that time period.

If there are a limited number of errors, or multiple errors all occurring at the same time, an event indicator 1712 can be displayed, indicating an error at that specific time. Should the user drill down further to a single error, an error indicator 1714 can be displayed. In some implementations, the error indicator 1714 is interactive. For example, if the user selects error indicator 1714, then further details, or even raw error text, can be displayed (e.g., in a tooltip).

This categorized Gantt chart provides the user with a means to quickly isolate errors of interest in a particular category, or clusters of errors occurring at similar times. The user can then readily interrogate the presented information, identifying errors or groups of errors of particular interest and reviewing detailed information related to those errors.

Figure 18:
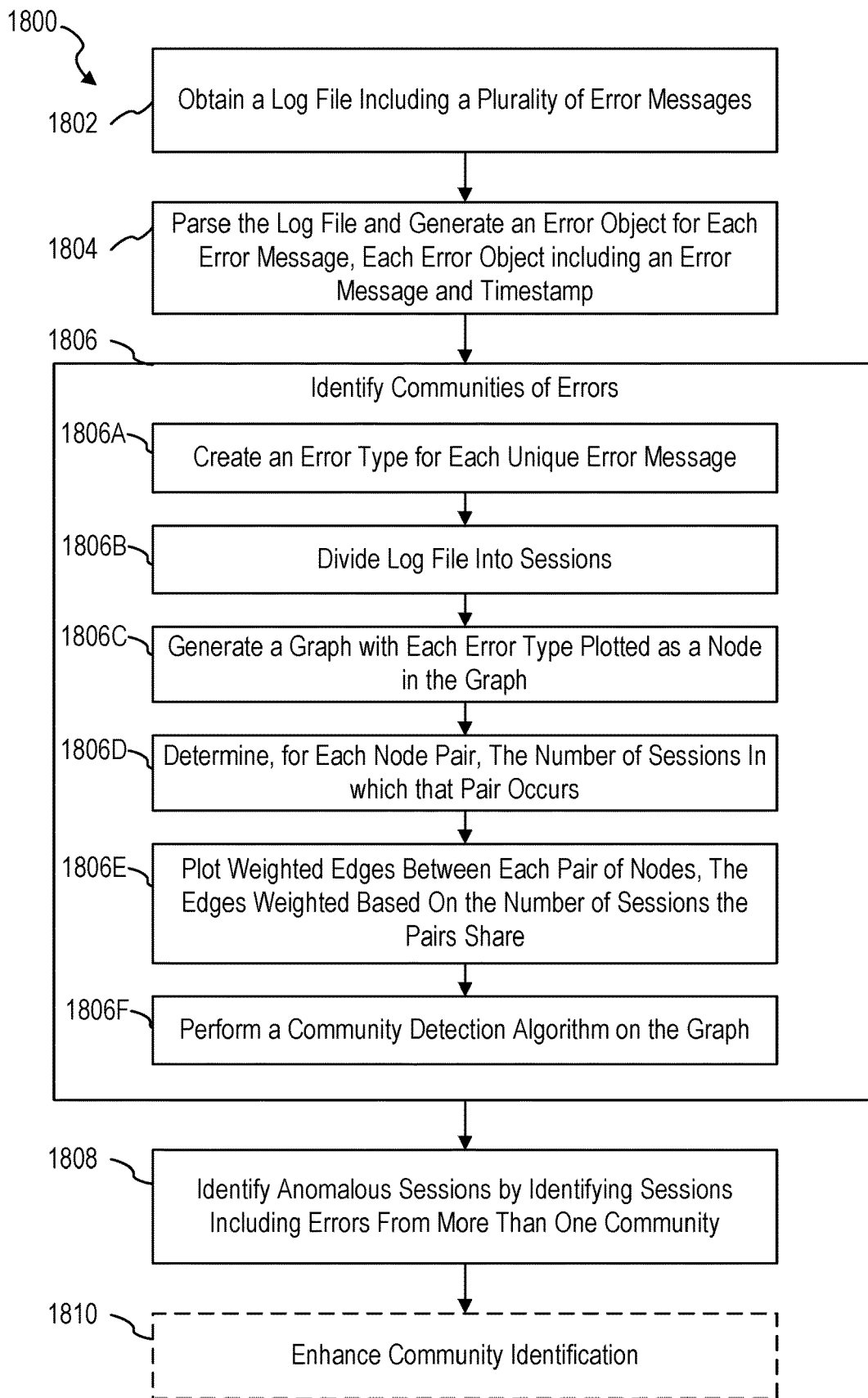
FIG. 18 is a flowchart illustrating an example process for performing odd pattern analysis.

FIG. 18 is a flowchart illustrating an example process 1800 for performing odd pattern analysis. The process 1800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the process 1800 are performed by the log analysis system 200 of FIG. 2, or any combination of one or more of its components (e.g., the analysis module 210, the interface module 220). In general, odd pattern analysis is a process for filtering a multitude of error messages in order to provide a user (e.g., developer, IT specialist, or system administrator) with a subset of the errors which are more likely to describe an anomalous event.

At 1802, a log file is obtained that includes a plurality of error messages. The log file can be similar to, or different from the example log file illustrated in FIG. 3 and can include hundreds, thousands, or more log entries (e.g., Entry 310 of FIG. 3) which described events that have previously occurred in executing software.

At 1804, the log file is parsed and an error object is generated for each error message. These error objects can include extracted data (e.g., extracted data 510 of FIG. 5) and grouped data (e.g., grouped data 610 of FIG. 6). In general, each error object represents a unique occurrence of an error, and includes attributes such as date, time, thread, operating condition of the device at the time of the error (e.g., CPU utilization, memory utilization etc.), and a text phrase associated with the error. In some implementations, each generated error object includes a timestamp and a text phrase that is an error message. In some implementations, 1604 is skipped entirely, and error messages from the log file are directly converted into error nodes (as described below with respect to 1806D) from raw form.

At 1806, the errors are analyzed in order to identify communities to which the errors belong. The community identification can be performed using any suitable grouping algorithm and an exemplary process (1806A-1806F), which is described below.

At 1806A, an error type is created for each unique error message. In some implementations, a unique error type is created for every text phrase or error message of the error objects in the log file. Thus, if the same error occurs more than once, only a single error type will be created, however there will be an error type present for each error. In some implementations, the error types can be further categories (e.g., using process 1600 of FIG. 16) in order to achieve greater numbers of errors per type. Each error type can be given a label or a name (e.g., E1, E2, etc.) or a serial number, which allows for simple identification of that error type.

At 1806B, the log file is divided into sessions, where each session is a predetermined time period. For example, the log file can be divided into 10 minutes sessions, 1 hour sessions, or other suitable time increments (e.g., 1 minute, 20 seconds, 1 week, etc.). In some implementations, the session duration is user selectable in a settings menu or via response to a prompt. In some implementations, process 1800 repeats multiple times, each iteration using a different session length. In some implementations, session length can be selected based on the number of errors present and overall length of the log file. For example, a desired error per session ratio can be selected and session length can be adjusted to achieve the closest average error per session ratio to the selected desired error per session ratio.

At 1806C, a graph is generated, with each error type from the log file plotted as a node in the graph.

At 1806D, each session that includes errors of two or more error types in that session is identified. For each of these sessions, the number of sessions that each error pair shares is determined.

At 1806E, edges are drawn between each pair of nodes in the graph. In some instances, edges are only drawn between nodes which both occur within at least one single session. In some instance, edges are drawn between every pair of nodes; however, if a particular pair of nodes have no occurrences in the same session, that edge is given a weight of zero. The edges are weighted based on the number of occurrences for that edge (e.g., that specific pair of errors) across multiple sessions. For example, if error nodes E1 and E3 occur together in every session that they occur (e.g., E1 and E3 share 10 sessions), then the edge between E1 and E3 will have a greater weight. Thus, following performance of 1806E, a graph is generated that includes nodes representing error types, and edges between the nodes representing the frequency at which these different error type occur together (i.e., in the same session).

At 1806F, a community detection algorithm is performed on the graph to identify communities of error types within the graph. The community detection algorithm can be, for example, the Louvain method, which is an efficient community detection network in instances of large networks by initially finding local (small) communities and amalgamating them into larger communities. Other suitable community detection methods can be, for example, the minimum-cut method, hierarchical clustering, Girvan-Newman algorithm, or others.

At 1808, sessions in the log file that include errors from more than one of the previously identified communities are identified as anomalous. These anomalous sessions can then be used to filter errors in the log file that are in non-anomalous sessions, greatly reducing the number of total errors presented to the user.

At 1810, optionally, the community identification process can be re-run or be enhanced. For example, additional algorithms can be run, and the error nodes can be re-categorized into different communities. In some implementations, centrality values for each node relative to its neighbors is determined. For a node that is relatively closely related to a community to which it was not assigned, for the purposes of odd pattern analysis, it can be assigned to two communities, therefore further reducing the number of anomalous sessions. For example, it may happen that in an anomalous session, there exists two different communities, but the nodes belonging to those two communities are closely bonded (unlike other nodes in the community). Due to certain other parameters, they may have been allotted different communities. To eliminate such cases, an additional algorithmic approach can be applied on top of the existing analysis. In this example, the centrality measure can be used as a parameter to check the closeness of a node with nodes of other communities in a session. If the centrality measure of the node with another community comes above a given threshold value, then that node is considered to be part of that community.

Figure 19:
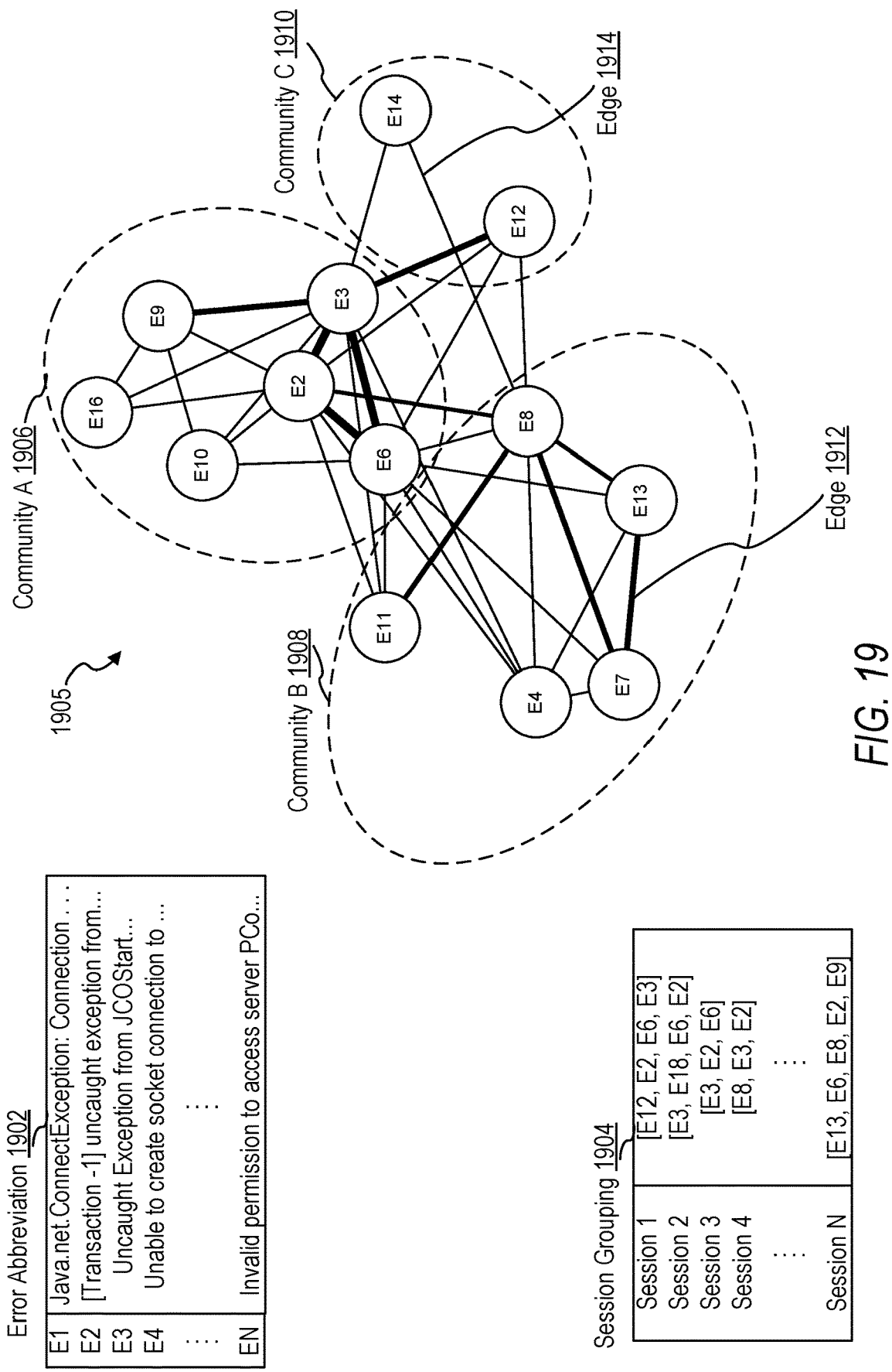
FIG. 19 illustrates an example graph analysis that can identify communities of errors.

FIG. 19 illustrates an example graph analysis that can identify communities of errors. FIG. 19 includes an error abbreviation table 1902, a session grouping table 1904, and a network graph 1905. It should be noted that the error abbreviation table 1902, session grouping table 1904, and network graph 1905 are each abbreviated/simplified compared to real world implementations, for clarity of disclosure. In practice, there can be up to, or greater than, thousands of errors, sessions, nodes, and edges in FIG. 19.

Error abbreviation table 1902 can be a list of each unique error type, and include an abbreviation for that error type (e.g., E1, E2, etc.). In some implementations, the error type is determined based on the error message contained within the error log, or a text phrase associated with the error. In some implementations, the error type is the result of additional processing of the error log (e.g., "data wrangling" as discussed above, or process 1600 as discussed with reference to FIG. 16).

Session grouping table 1904 divides the error log into a number of sessions and lists a grouping of errors occurring in that section. For example, session 3 includes E3, E2, and E6. These groupings are then used to define the edges and their weights in the network graph 1905. For example, E2 and E3 occur in the same session in sessions 1, 2, 3, and 4 in session grouping table 1904. Therefore, the edge between E2 and E3 will have a more significant weight than the edge between, for example, E2 and E9, which only occurs in session N of the example session grouping table 1904.

Network graph 1905 illustrates the nodes with their edges drawn. Thicker edges indicate more weight, or more frequent occurrences in the same session between two nodes. This indicates a closer relationship between the two errors. For example, edge 1912 is thicker then edge 1914 indicating a stronger relationship between E7 and E13 than between E8 and E14. With the completed network graph 1905, a community detection algorithm (e.g., the Louvain Method) can be performed to identify one or more communities within the network graph 1905. In the illustrated example, community A 1906, community B 1908, and community C 1910 have been identified.

Figure 20:
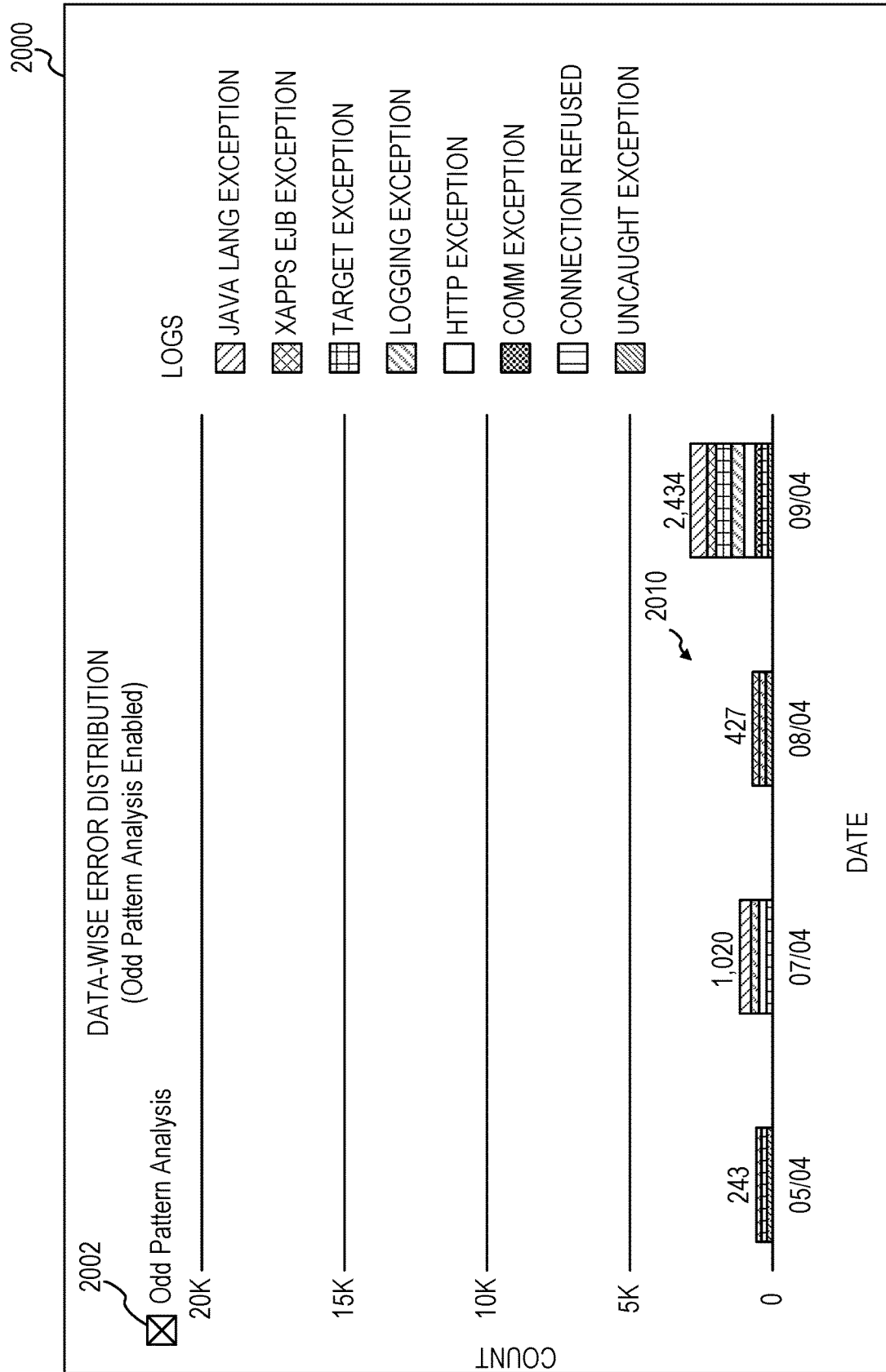
FIG. 20 illustrates an example GUI with an odd pattern analysis filter enabled.

FIG. 20 illustrates an example GUI 2000 with an odd pattern analysis filter enabled. The GUI 2000 of FIG. 20 is a data-wise error distribution graph, similar to the graph shown in FIG. 7. However, unlike FIG. 7, the odd pattern analysis feature is enabled via a GUI element 2002, which has significantly reduced the number of errors present. For example, the corresponding count 710 in FIG. 7 for the August/2004 dataset was 2,987. In FIG. 20, with odd pattern analyses enabled, that count has been filtered, only showing anomalous errors, and is 427. By enabling odd pattern analysis, a developer or system administrator can rapidly reduce their workload by automatically focusing on errors that are likely to be causing system crashes/instability.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A computer implemented method comprising:
   obtaining a log file comprising a plurality of log entries, each log entry comprising an error message and a timestamp;
   identifying communities of errors, where identifying communities of errors comprises:
      creating an error type for each unique error message in the plurality of log entries;
      dividing the log file into a plurality of sessions, each session representing a predetermined period of time;
      generating a graph, wherein each error type is plotted as a node in the graph;
      determining, for a plurality of node pairs, a number of sessions in which both nodes of each node pair occur;
      plotting edges between each node pair of the plurality of node pairs;
      assigning a weight to each edge based on the determined number of sessions; and
      performing a community detection algorithm on the graph to identify communities of errors; and
   identifying anomalous sessions by identifying sessions comprising errors from more than one community.

2. The method of claim 1, wherein the community detection algorithm is a Louvain method.

3. The method of claim 1, comprising receiving a user input identifying a desired length of sessions; and
   overwriting a default session length with the desired length of sessions as the predetermined period of time.

4. The method of claim 1, comprising:
   parsing the log file to extract each error message from the plurality of log entries; and
   generating, for each error message, an error object, the error object comprising at least one attribute associated with the error.

5. The method of claim 4, wherein at least one attribute comprises a date and time of the error and a text phrase associated with the error.

6. The method of claim 1, wherein identifying communities of errors comprises:
   determine, for each particular node, a plurality of centrality values, each centrality value representing a closeness of the particular node with a particular community to which it is not assigned; and for each particular node with a centrality value greater than a predetermined threshold, assign that node to the particular community associated with the centrality value in addition to the identified communities of errors.

7. The method of claim 1, wherein identifying communities of errors is done in response to a user interaction at a graphical user interface.

8. A non-transitory, computer-readable medium storing one or more instructions executable by a computer system to perform operations comprising:

obtaining a log file comprising a plurality of log entries, each log entry comprising an error message and a timestamp;

identifying communities of errors, where identifying communities of errors comprises:

creating an error type for each unique error message in the plurality of log entries;

dividing the log file into a plurality of sessions, each session representing a predetermined period of time;

generating a graph, wherein each error type is plotted as a node in the graph;

determining, for a plurality of node pairs, a number of sessions in which both nodes of each node pair occur;

plotting edges between each node pair of the plurality of node pairs;

assigning a weight to each edge based on the determined number of sessions; and performing a community detection algorithm on the graph to identify communities of errors; and identifying anomalous sessions by identifying sessions comprising errors from more than one community.

9. The computer-readable medium of claim 8, wherein the community detection algorithm is a Louvain method.

10. The computer-readable medium of claim 8, comprising receiving a user input identifying a desired length of sessions; and overwriting a default session length with the desired length of sessions as the predetermined period of time.

11. The computer-readable medium of claim 8, comprising:

parsing the log file to extract each error message from the plurality of log entries; and generating, for each error message, an error object, the error object comprising at least one attribute associated with the error.

12. The computer-readable medium of claim 11, wherein at least one attribute comprises a date and time of the error and a text phrase associated with the error.

13. The computer-readable medium of claim 8, wherein identifying communities of errors comprises:

determine, for each particular node, a plurality of centrality values, each centrality value representing a closeness of the particular node with a particular community to which it is not assigned; and for each particular node with a centrality value greater than a predetermined threshold, assign that node to the particular community associated with the centrality value in addition to the identified communities of errors.

14. The computer-readable medium of claim 8, wherein identifying communities of errors is done in response to a user interaction at a graphical user interface.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a log file comprising a plurality of log entries, each log entry comprising an error message and a timestamp;

identifying communities of errors, where identifying communities of errors comprises:

creating an error type for each unique error message in the plurality of log entries;

dividing the log file into a plurality of sessions, each session representing a predetermined period of time;

generating a graph, wherein each error type is plotted as a node in the graph;

determining, for a plurality of node pairs, a number of sessions in which both nodes of each node pair occur;

plotting edges between each node pair of the plurality of node pairs;

assigning a weight to each edge based on the determined number of sessions; and performing a community detection algorithm on the graph to identify communities of errors; and identifying anomalous sessions by identifying sessions comprising errors from more than one community.

16. The system of claim 15, wherein the community detection algorithm is a Louvain method.

17. The system of claim 15, comprising receiving a user input identifying a desired length of sessions; and overwriting a default session length with the desired length of sessions as the predetermined period of time.

18. The system of claim 15, comprising:

parsing the log file to extract each error message from the plurality of log entries; and generating, for each error message, an error object, the error object comprising at least one attribute associated with the error.

19. The system of claim 18, wherein at least one attribute comprises a date and time of the error and a text phrase associated with the error.

20. The system of claim 15, wherein identifying communities of errors comprises:

determine, for each particular node, a plurality of centrality values, each centrality value representing a closeness of the particular node with a particular community to which it is not assigned; and for each particular node with a centrality value greater than a predetermined threshold, assign that node to the particular community associated with the centrality value in addition to the identified communities of errors.

* * * * *